US012684333B2

(12) United States Patent
Raj et al.

(10) Patent No.: US 12,684,333 B2
(45) Date of Patent: Jul. 14, 2026

(54) METHODS AND SYSTEMS FOR CONTINUING OPERATION OF MUSIM UE IN SPECIFIC MODE

(71) Applicant: Samsung Electronics Co., Ltd., Suwon-si (KR)

(72) Inventors: Rohan Raj, Bengaluru (IN); Ashish Kumar Gupta, Bengaluru (IN); Sanjeevi Reddy Gondesi Venkata Mallikarjuna, Bengaluru (IN); Mohanraja Balasubramaniam, Bengaluru (IN); Prashant Ashokchitare, Bengaluru (IN); Ramkumar Thirumalli Sureshsah, Bengaluru (IN); Vinay Kumar Shrivastava, Bengaluru (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 247 days.

(21) Appl. No.: 18/462,662

(22) Filed: Sep. 7, 2023

(65) Prior Publication Data

US 2024/0098480 A1 Mar. 21, 2024

(30) Foreign Application Priority Data

Sep. 8, 2022 (IN) .............................. 202241051463

(51) Int. Cl.
*H04W 8/20* (2009.01)
*H04B 17/318* (2015.01)
(Continued)

(52) U.S. Cl.
CPC ............ H04W 8/20 (2013.01); H04B 17/328 (2023.05); H04W 36/362 (2023.05); H04W 76/20 (2018.02)

(58) Field of Classification Search
CPC ..... H04W 8/20; H04W 36/362; H04W 76/20; H04W 8/18; H04W 88/06; H04W 72/231; (Continued)

(56) References Cited

U.S. PATENT DOCUMENTS 10,517,003 B2 12/2019 Bhardwaj et al.
10,623,946 B1 * 4/2020 Kumar .................. H04W 76/16
(Continued)

FOREIGN PATENT DOCUMENTS

EP 4040913 A1 8/2022
WO WO-2018111788 A1 6/2018
(Continued)

OTHER PUBLICATIONS

Apple Inc, "Aspects of MUSIM RRC Band Conflict, Processing Delay and Caller ID", 3GPP TSG-RAN WG2 Meeting # 115 Electronic, R2-2107598 (Year: 2021).*
(Continued)

*Primary Examiner* — Ayaz R Sheikh
*Assistant Examiner* — Mang Boi Thawng
(74) *Attorney, Agent, or Firm* — Harness, Dickey & Pierce, P.L.C.

(57) ABSTRACT

A method performed by a multi-subscriber identity module (MUSIM) user equipment (UE) for continuing operation of the MUSIM UE in a first mode, the MUSIM UE including a first SIM and a second SIM, and the method including transmitting, by the MUSIM UE, an uplink signalling message in response to determining a trigger condition has been satisfied, the uplink signalling message including one of compatible band information for the first SIM and the SIM, or one or more other stacks serving band information associated with the second SIM, receiving, by the MUSIM UE from a network, a radio resource control (RRC) reconfiguration signalling message for performing at least one
(Continued)

activity at the first SIM in response to the transmitting the uplink signalling message, and performing, by the MUSIM UE, the at least one activity based on the RRC reconfiguration signalling message.

20 Claims, 18 Drawing Sheets

(51) Int. Cl.
    *H04W 36/36*         (2009.01)
    *H04W 76/20*         (2018.01)

(58) Field of Classification Search
    CPC . H04W 24/10; H04W 72/21; H04W 36/0058; H04W 36/0069; H04W 36/008355; H04W 36/0085; H04W 36/302; H04B 17/328; H04L 5/0053
    See application file for complete search history.

(56)                References Cited

U.S. PATENT DOCUMENTS

| | | |
|---|---|---|
| 2018/0027471 A1 | 1/2018 | Zhang et al. |
| 2018/0077728 A1 | 3/2018 | Shi et al. |
| 2020/0053642 A1 | 2/2020 | Huang-Fu et al. |
| 2020/0112969 A1 | 4/2020 | Dai |
| 2021/0105607 A1* | 4/2021 | Ioffe .................. H04W 68/005 |

| | | | |
|---|---|---|---|
| 2022/0104103 A1 | 3/2022 | Lee et al. | |
| 2022/0141919 A1 | 5/2022 | Lee et al. | |
| 2022/0150788 A1* | 5/2022 | Jiang ................. | H04W 36/0085 |
| 2022/0210632 A1* | 6/2022 | Tseng ................... | H04W 8/183 |
| 2022/0240078 A1* | 7/2022 | Park ...................... | H04W 24/08 |
| 2022/0256410 A1* | 8/2022 | Zhang .................. | H04W 88/06 |
| 2022/0264523 A1 | 8/2022 | Fehrenbach et al. | |
| 2022/0361132 A1* | 11/2022 | Gurumoorthy ..... | H04W 60/005 |
| 2023/0010736 A1* | 1/2023 | Hebein ................. | H04W 76/15 |
| 2023/0011024 A1* | 1/2023 | Hebein ............. | H04W 52/0241 |
| 2023/0269636 A1* | 8/2023 | Lee ..................... | H04W 36/305 |
| | | | 370/331 |
| 2024/0187898 A1* | 6/2024 | Sabouri-Sichani ... | H04W 24/10 |
| 2025/0365654 A1* | 11/2025 | Kim ...................... | H04W 76/30 |

FOREIGN PATENT DOCUMENTS

| | | |
|---|---|---|
| WO | WO-2018171721 A1 | 9/2018 |
| WO | WO-2021097231 A1 | 5/2021 |
| WO | 2021148192 A1 | 7/2021 |
| WO | WO-2022082579 A1 | 4/2022 |
| WO | WO-2022082778 A1 | 4/2022 |
| WO | WO-2022154518 A1 | 7/2022 |

OTHER PUBLICATIONS

Extended European Search Report, dated Feb. 16, 2024, issued in European Patent Application No. 23195938.8.

* cited by examiner

Figure 2:
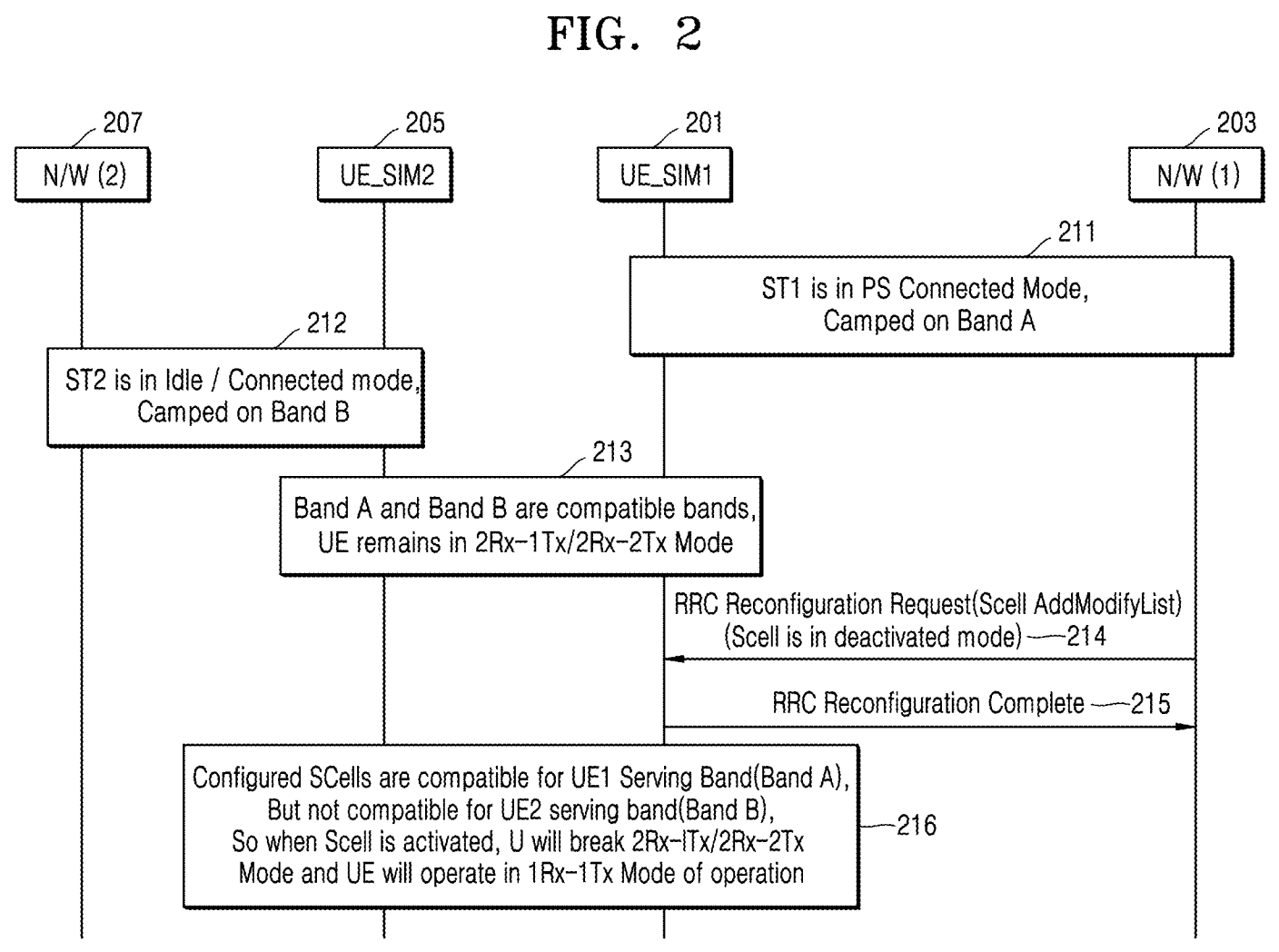

205 — UE_SIM2

201 — UE_SIM1

203 — N/W (1)

211 — ST1 is in PS Connected Mode, Camped on Band A

212 — ST2 is in Idle / Connected mode, Camped on Band B

213 — Band A and Band B are compatible bands, UE remains in 2Rx–1Tx/2Rx–2Tx Mode 214 — RRC Reconfiguration Request(Scell AddModifyList) (Scell is in deactivated mode)

215 — RRC Reconfiguration Complete

216 — Configured SCells are compatible for UE1 Serving Band(Band A), But not compatible for UE2 serving band(Band B), So when Scell is activated, U will break 2Rx–1Tx/2Rx–2Tx Mode and UE will operate in 1Rx–1Tx Mode of operation

FIG. 3

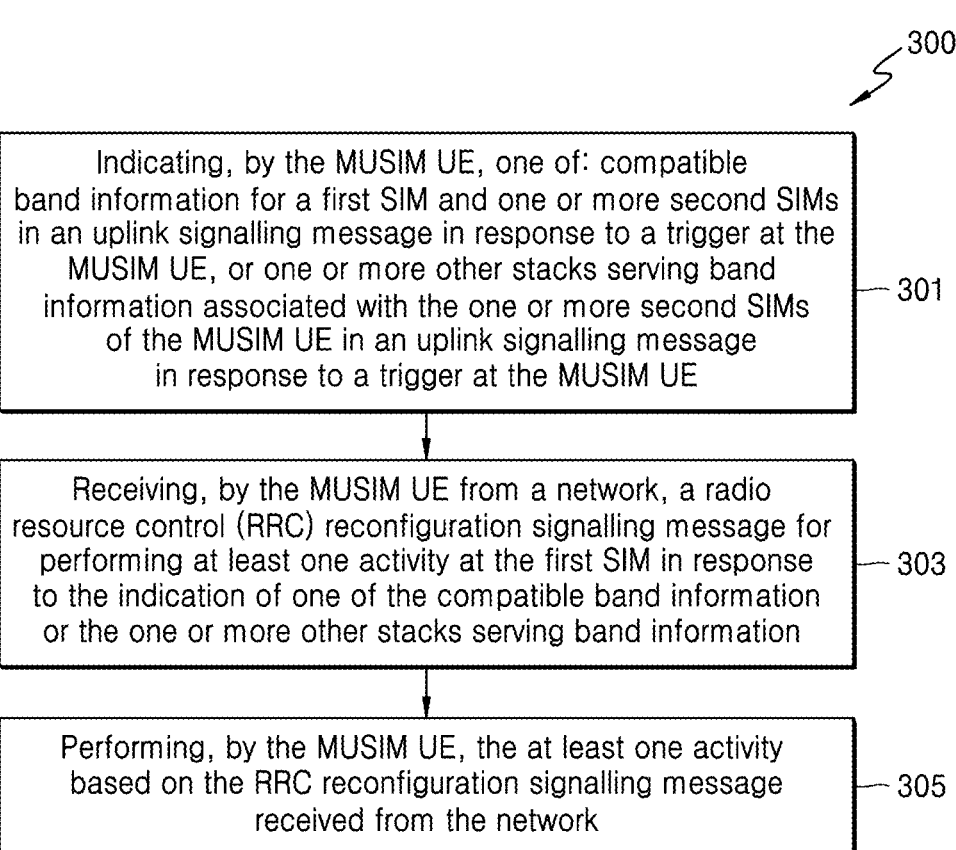

_300

Indicating, by the MUSIM UE, one of: compatible band information for a first SIM and one or more second SIMs in an uplink signalling message in response to a trigger at the MUSIM UE, or one or more other stacks serving band information associated with the one or more second SIMs of the MUSIM UE in an uplink signalling message in response to a trigger at the MUSIM UE — 301

Receiving, by the MUSIM UE from a network, a radio resource control (RRC) reconfiguration signalling message for performing at least one activity at the first SIM in response to the indication of one of the compatible band information or the one or more other stacks serving band information — 303

Performing, by the MUSIM UE, the at least one activity based on the RRC reconfiguration signalling message received from the network — 305

Figure 6C:
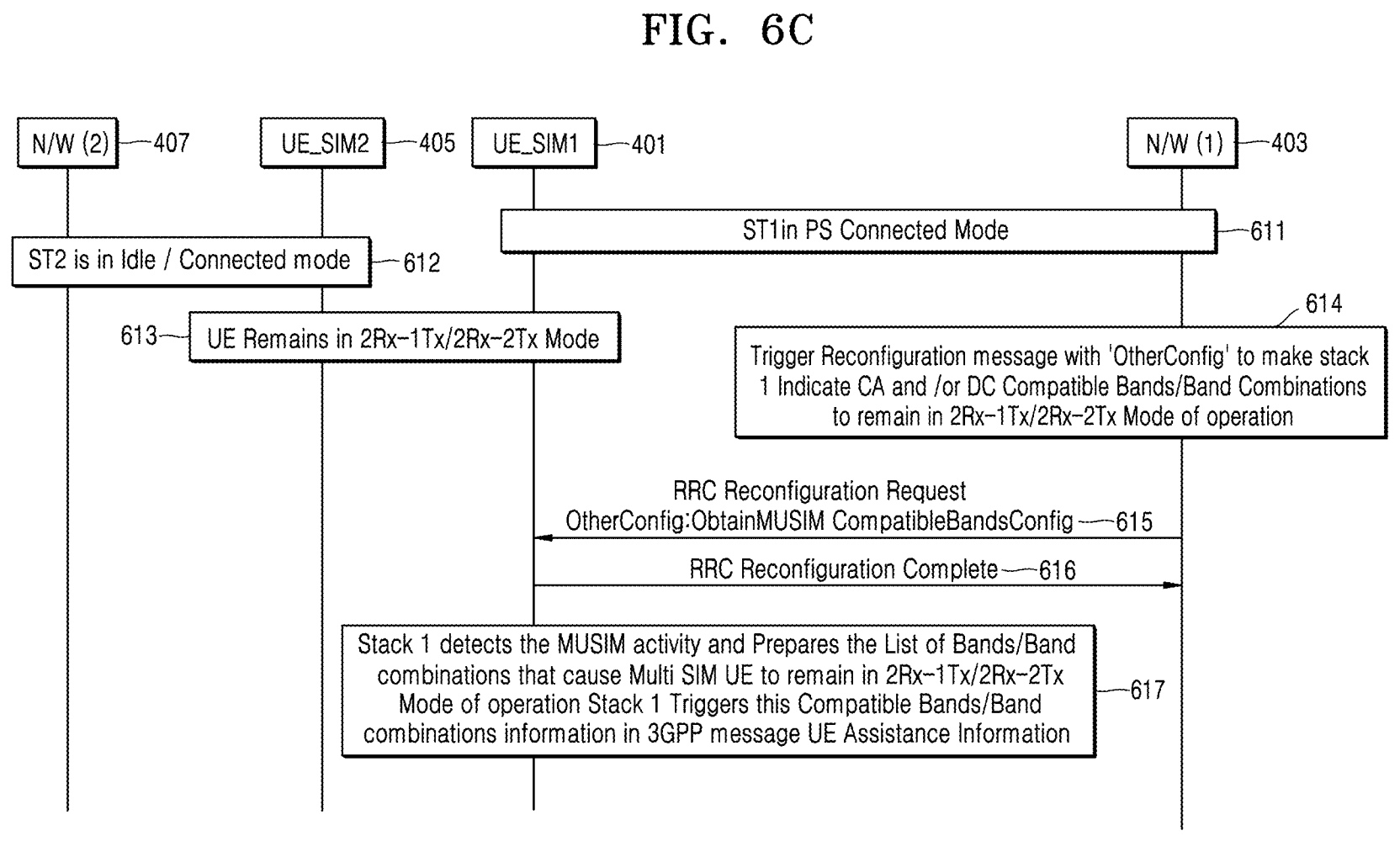

614 — Trigger Reconfiguration message with 'OtherConfig' to make stack 1 Indicate CA and /or DC Compatible Bands/Band Combinations to remain in 2Rx–1Tx/2Rx–2Tx Mode of operation ST1in PS Connected Mode

UE_SIM1 —401

RRC Reconfiguration Request
OtherConfig:ObtainMUSIM CompatibleBandsConfig —615

RRC Reconfiguration Complete —616

UE Remains in 2Rx–1Tx/2Rx–2Tx Mode

617 — Stack 1 detects the MUSIM activity and Prepares the List of Bands/Band combinations that cause Multi SIM UE to remain in 2Rx–1Tx/2Rx–2Tx Mode of operation Stack 1 Triggers this Compatible Bands/Band combinations information in 3GPP message UE Assistance Information

UE_SIM2 —405

612

ST2 is in Idle / Connected mode

Figure 6D:
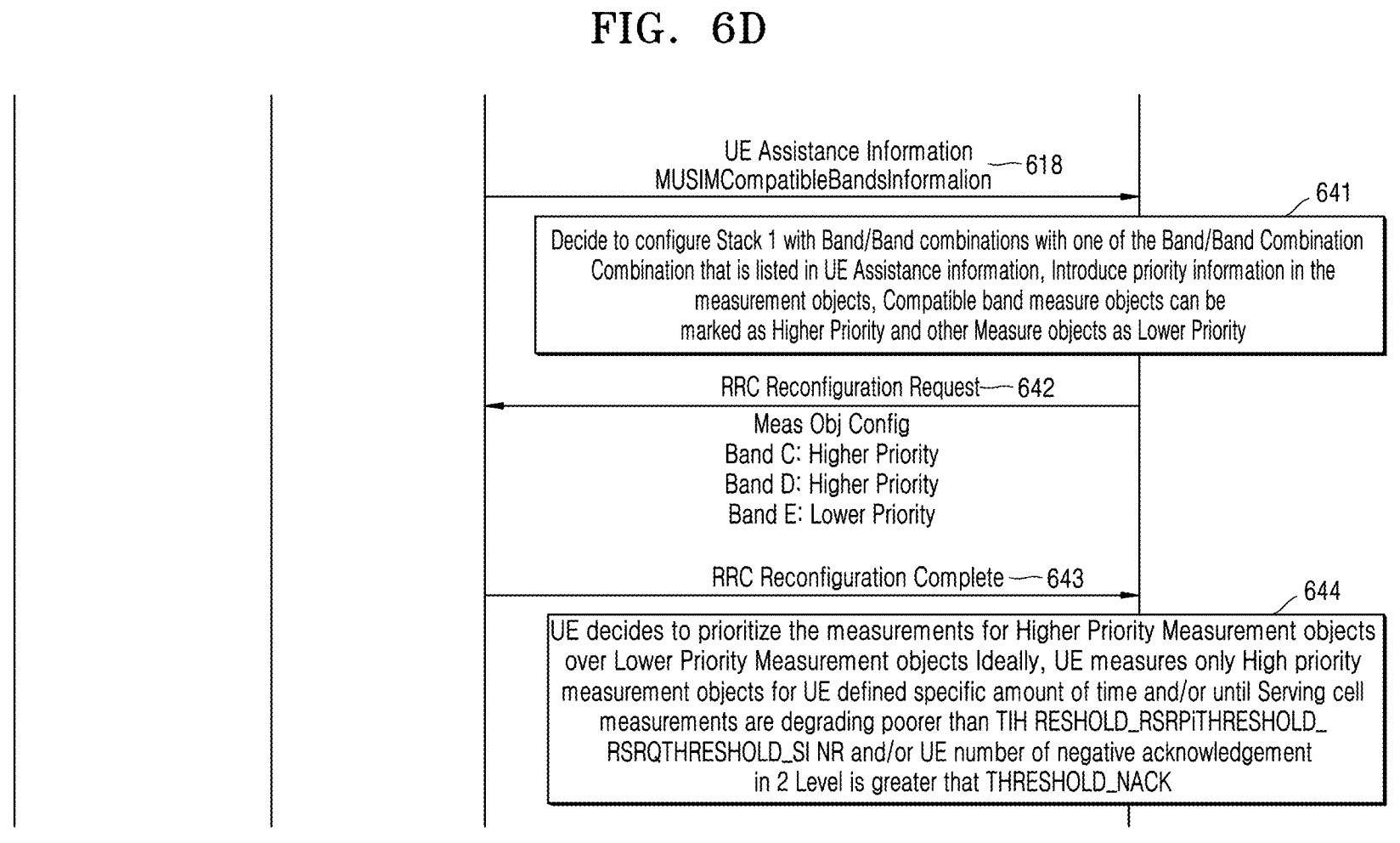

UE Assistance Information ——— 618
MUSIMCompatibleBandsInformation

641

Decide to configure Stack 1 with Band/Band combinations with one of the Band/Band Combination
Combination that is listed in UE Assistance information, Introduce priority information in the
measurement objects, Compatible band measure objects can be
marked as Higher Priority and other Measure objects as Lower Priority RRC Reconfiguration Request——— 642

Meas Obj Config
Band C: Higher Priority
Band D: Higher Priority
Band E: Lower Priority RRC Reconfiguration Complete ——— 643

644

UE decides to prioritize the measurements for Higher Priority Measurement objects
over Lower Priority Measurement objects Ideally, UE measures only High priority
measurement objects for UE defined specific amount of time and/or until Serving cell
measurements are degrading poorer than TIH RESHOLD_RSRPiTHRESHOLD_
RSRQTHRESHOLD_SI NR and/or UE number of negative acknowledgement
in 2 Level is greater that THRESHOLD_NACK

METHODS AND SYSTEMS FOR CONTINUING OPERATION OF MUSIM UE IN SPECIFIC MODE

CROSS-REFERENCE TO RELATED APPLICATIONS

This application claims priority to Indian Provisional Patent Application No. 202241051463 filed on Sep. 8, 2022, the disclosure of which is hereby incorporated by reference herein in its entirety.

FIELD OF THE DISCLOSURE

The present disclosure relates to methods and systems for continuing operation of a multi-subscriber identity module (MUSIM) user equipment (UE) in a specific mode.

BACKGROUND OF THE DISCLOSURE

With an increase in demand for mobile devices, e.g., user equipment (UE), multi-subscriber identity module (MUSIM) UEs are gaining popularity. Therefore, the 3rd generation partnership project (3GPP) has started a study item for defining protocol and methods for the MUSIM UEs. The MUSIM UEs may be categorized based on the hardware capability of the UEs as 1 transmitter (Tx)/1 receiver (Rx), 1Tx/2Rx, 2Tx/2Rx, MTx/NRx, etc. A MUSIM UE built with 1Tx/2Rx is capable of receiving simultaneously (or contemporaneously) from two networks associated with the MUSIM UE but is capable of transmitting with one network only (only one network at a time). Similarly, a MUSIM UE built with 2Tx/2Rx is capable of receiving and transmitting simultaneously (or contemporaneously) with two networks. Similarly, MTx/NRx UEs, where M, N>1, are capable of receiving and transmitting simultaneously (or contemporaneously) with more than one network at a time. Accordingly, the ability to receive and transmit simultaneously (or contemporaneously) with more than one network at a time improves the performance of such MUSIM UEs as compared to 1Tx/1Rx UEs. However, simultaneous (or contemporaneous) reception in case of a 1Tx/2Rx UE and simultaneous (or contemporaneous) reception/transmission in case of a 2Tx/2Rx UE is possible, only if the serving band of all the SIMS associated with the MUSIM UE is carrier aggregation (CA) compatible or ensuring that one or more radio operations on one SIM align compatibly with the serving band of other SIM and vice-versa. When the serving band of one of the SIMs moves to an incompatible band, then simultaneous (or contemporaneous) reception or simultaneous (or contemporaneous) transmission is not supported. In such scenarios, the MUSIM UEs fall back to using only 1Tx/1Rx at a time. Even though the MUSIM UE is built with more than one Rx or more than one Rx and Tx, such capability is limited when the MUSIM UE camps or performs any operation on non-CA compatible bands on one of the SIMS. Hence, a MUSIM UE which supports MTx/NRx limits its operation to 1Rx/1Tx because the band combination between multiple SIMS of the MUSIM UE is not compatible. This limitation impacts data, call, and mobility of the MUSIM UE, and hence the MUSIM UE's capability is not fully utilized, and degradation in user performance is observed. This challenge occurs when one of the SIMs of the MUSIM UE camps to a non-compatible band.

Further, band incompatibility between the SIMS occurs due to the following reasons:

a. When the SIMS of the MUSIM UE are camped on compatible bands, but due to the mobility of one of the SIMS or compatible bands not being configured by the network, then band compatibility may not continue, as shown in FIG. 1 discussed later herein.

b. When the SIMs of the MUSIM UE are camped on the compatible bands but the addition of a secondary cell (Scell) on any of the SIMS may cause incompatibility with other SIM and Scell bands, as shown in FIG. 2 discussed later herein.

c. When the SIMs are camped with the compatible bands and the network has configured the UE for a conditional handover (CHO) to a non-compatible band, then band compatibility may not continue. For example, let us assume that SIM 1 is in a packet switched (PS) connected mode with a first network (N/W (1)) and is camped on a frequency band A. SIM 2 is also in PS-connected mode with a second network (N/W (2)) and is camped on a frequency band B. As band A and band B are compatible bands, the MUSIM UE is in the 2Rx-1Tx/2Rx-2Tx mode of operation. It is assumed that the frequency band B and a frequency band E are not compatible. When CHO configuration is received at the SIM1 with frequency bands C, D, and E, the MUSIM UE may decide to choose band E based on the configuration received from the first network, which causes the MUSIM UE to fall back to 1Rx/1Tx mode instead of the 2Rx/1Tx or 2Rx/2Tx mode (as band B and band E are incompatible).

d. When the SIMS are camped with the compatible bands and the network has configured the compatible and non-compatible bands for measurements, but if the network does not provide any priority to measure the bands, it may cause the MUSIM UE to measure non-compatible band frequencies.

FIG. 1 illustrates a scenario of non-compatibility between SIMS of the MUSIM UE, in accordance with prior art. As shown in FIG. 1, at operation 111, SIM 1 (ST1) 101 (also referred to herein as UE_SIM1) of the MUSIM UE is in connected mode with the first network (N/W (1)) 103 and is camped on the frequency band A. At operation 112, SIM 2 (ST2) 105 (also referred to herein as UE_SIM2) of the MUSIM UE is in idle or in connected mode with the second network (N/W (2)) 107 and is camped on the frequency band B. At operation 113, it may be seen that band A and band B are compatible bands. Accordingly, the MUSIM UE is in the 1Tx/2Rx or 2Tx/2Rx mode of operation. However, at operation 114, SIM 2 105 reselects/is handed over to a frequency band C, or the N/W (2) 107 configures the SIM 2 105 for measurement configuration of the band C frequencies. However, as may be seen at operation 115, the band C is incompatible with band A, so, the MUSIM UE breaks the 1Tx/2Rx or 2Tx/2Rx mode of operation and falls back to a 1Tx/1Rx mode of operation.

FIG. 2 illustrates a scenario of non-compatibility between SIMS of the MUSIM UE due to the addition of an SCell, in accordance with prior art. As shown in FIG. 2, at operation 211, SIM 1 (ST1) 201 is in a PS-connected mode with the first network (N/W (1)) 203 and is camped on the frequency band A. At operation 212, SIM 2 (ST2) 205 of the MUSIM UE is in idle or in connected mode with the second network (N/W (2)) 207 and is camped on the frequency band B. At operation 213, it may be seen that band A and band B are compatible bands. Accordingly, the MUSIM UE is in the 1Tx/2Rx or 2Tx/2Rx mode of operation. At operation 214, the first network 203 triggers a radio resource control (RRC) reconfiguration request message with Scells, which are compatible with the 1Tx/2Rx or 2Tx/2Rx mode of operation with the band A but are not compatible with the band B. At operation 215, the SIM 1 201 responds with an RRC reconfiguration complete message. At operation 216, it may be seen that the Configured SCells are compatible with band A, but not compatible with band B. Hence, when the Scell is activated, the MUSIM UE breaks 1Tx/2Rx or 2Tx/2Rx mode and the MUSIM UE falls back to the 1Tx/1Rx mode of operation.

Hence, frequency bands on which SIMS of the MUSIM UE are active should be compatible to avoid or reduce blackout which impacts the mobility, throughput, and call performances of the MUSIM UE.

SUMMARY OF THE PRESENT DISCLOSURE

This summary is provided to introduce a selection of concepts in a simplified format that are further described in the detailed description below. This summary is not intended to identify key or essential inventive concepts, nor is it intended for determining the scope of the inventive concepts. Embodiments provide techniques that overcome the above-discussed challenges.

In embodiments, the present disclosure refers to a method performed by a multi-subscriber identity module (MUSIM) user equipment (UE) for continuing operation of the MUSIM UE in a first mode, the MUSIM UE including a first SIM and one or more second SIMS, and the method including transmitting, by the MUSIM UE, an uplink signalling message in response to determining a trigger condition has been satisfied, the uplink signalling message including one of compatible band information for the first SIM and the one or more second SIMS, or one or more other stacks serving band information associated with the one or more second SIMS, receiving, by the MUSIM UE from a network, a radio resource control (RRC) reconfiguration signalling message for performing at least one activity at the first SIM in response to the transmitting the uplink signalling message, and performing, by the MUSIM UE, the at least one activity based on the RRC reconfiguration signalling message.

In embodiments, a system for continuing operation of a multi-subscriber identity module (MUSIM) user equipment (UE) in a first mode, the MUSIM including a first SIM and one or more second SIMs, and the system including processing circuitry configured to transmit an uplink signalling message in response to determining a trigger condition has been satisfied, the uplink signalling message including one of compatible band information for the first SIM and the one or more second SIMS, or one or more other stacks serving band information associated with the one or more second SIMs, receive, from a network, a radio resource control (RRC) reconfiguration signalling message for performing at least one activity at the first SIM in response to the transmission of the uplink signalling message, and perform the at least one activity based on the RRC reconfiguration signalling message.

In embodiments, the present disclosure refers to a method for continuing operation of a multi-subscriber identity module (MUSIM) user equipment (MUSIM UE) in a first mode, the MUSIM UE including a first SIM and one or more second SIMs, and the method including receiving, at a network from the MUSIM UE, an uplink signalling message in response to satisfaction of a trigger condition at the MUSIM UE, the uplink signalling message including one of compatible band information for the first SIM and the one or more second SIMs, or one or more other stacks serving band information associated with the one or more second SIMS,

4 and transmitting, from the network to the MUSIM UE, a radio resource control (RRC) reconfiguration signalling message for performing at least one activity at the first SIM in response to the uplink signalling message.

In embodiments, a system for continuing operation of a multi-subscriber identity module (MUSIM) user equipment (MUSIM UE) in a first mode, the MUSIM including a first SIM and one or more second SIMS, and the system including processing circuitry configured to receive, from the MUSIM UE, an uplink signalling message in response to satisfaction of a trigger condition at the MUSIM UE, the uplink signalling message including one of compatible band information for the first SIM and the one or more second SIMS, or one or more other stacks serving band information associated with the one or more second SIMS, and transmit, to the MUSIM UE, a radio resource control (RRC) reconfiguration signalling message for performing at least one activity at the first SIM in response to the uplink signalling message.

To further clarify the advantages and features of the present disclosure, a more particular description of the inventive concepts will be rendered by reference to embodiments thereof, which is illustrated in the appended drawing. It is appreciated that these drawings depict only typical examples of the inventive concepts and are therefore not to be considered limiting its scope. The inventive concepts will be described and explained with additional specificity and detail with the accompanying drawings.

BRIEF DESCRIPTION OF THE DRAWINGS

These and other features, aspects, and advantages of the present inventive concepts will become better understood when the following detailed description is read with reference to the accompanying drawings in which like characters represent like parts throughout the drawings, wherein:

FIG. 2 illustrates a scenario of non-compatibility between SIMS of the MUSIM UE due to the addition of an SCell, in accordance with the prior art;

FIG. 3 illustrates a flow chart depicting a method at a multi-subscriber identity module (MUSIM) user equipment (UE) for continuing operation of the MUSIM UE in a specific mode, in accordance with embodiments of the present disclosure;

FIGS. 6A-6D illustrate various scenarios of retaining the specific mode, in accordance with embodiments of the present disclosure;

Figure 1:
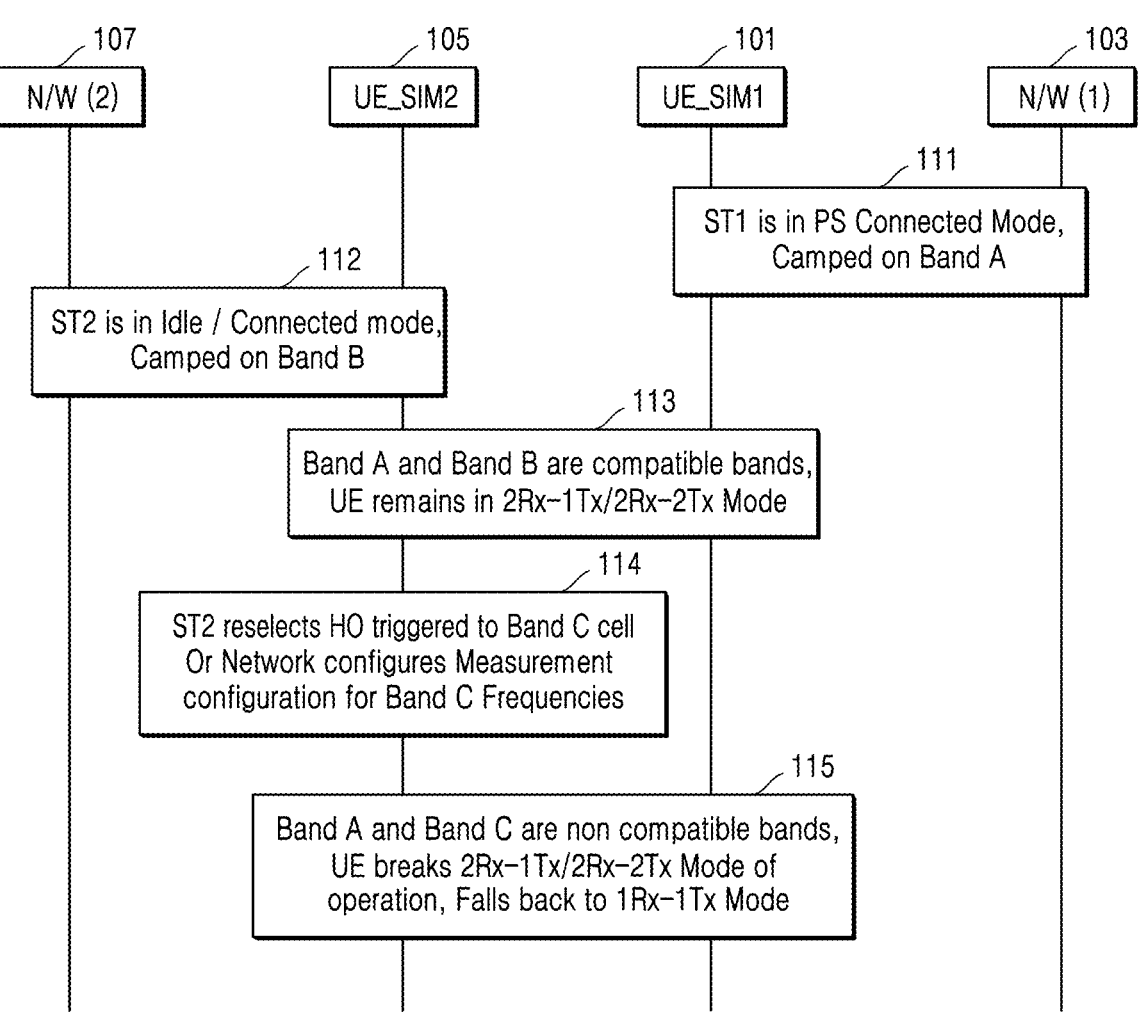
FIG. 1 illustrates a scenario of non-compatibility between SIMS of the MUSIM UE, in accordance with the prior art.

Further, skilled artisans will appreciate that elements in the drawings are illustrated for simplicity and may not have been drawn to scale. For example, the flow charts illustrate a method in terms of the most prominent operations involved to help to improve understanding of aspects of the inventive concepts. Furthermore, in terms of the construction of a system, one or more components of the system may have been represented in the drawings by conventional symbols, and the drawings may show only those specific details that are pertinent to understanding embodiments of the inventive concepts so as not to obscure the drawings with details that will be readily apparent to those of ordinary skill in the art having the benefit of the description herein.

DETAILED DESCRIPTION

For the purpose of promoting an understanding of the principles of the inventive concepts, reference will now be made to embodiments illustrated in the drawings and specific language will be used to describe the same. It will nevertheless be understood that no limitation of the scope of the inventive concepts is thereby intended, such alterations and further modifications in the illustrated system, and such further applications of the principles of the inventive concepts as illustrated therein being contemplated as would normally occur to one skilled in the art to which the inventive concepts relate.

It will be understood by those skilled in the art that the foregoing general description and the following detailed description are explanatory of the inventive concepts and are not intended to be restrictive thereof.

Reference throughout this specification to "an aspect", "another aspect" or similar language means that a particular feature, structure, or characteristic described in connection with an example is included in embodiments of the inventive concepts.

The terms "comprise", "comprising", or any other variations thereof, are intended to cover a non-exclusive inclusion, such that a process or method that comprises a list of operations may not include only those operations but may include other operations not expressly listed or inherent to such a process or method. Similarly, one or more devices or sub-systems or elements or structures or components proceeded by "comprises . . . a" does not, without more constraints, preclude the existence of other devices, other sub-systems, other elements, other structures, other components, additional devices, additional sub-systems, additional elements, additional structures or additional components.

Embodiments herein and the various features and advantageous details thereof are explained more fully with reference to the non-limiting examples that are illustrated in the accompanying drawings and detailed in the following description. Descriptions of well-known components and processing techniques are omitted so as to not unnecessarily obscure embodiments herein. Also, embodiments described herein are not necessarily mutually exclusive, as embodiments may be combined. The term "or" as used herein, refers to a non-exclusive or unless otherwise indicated. The examples used herein are intended merely to facilitate an understanding of ways in which embodiments herein may be practiced and to further enable those skilled in the art to practice embodiments herein. Accordingly, the examples should not be construed as limiting the scope of embodiments herein.

As is traditional in the field, embodiments may be described and illustrated in terms of blocks that carry out a described function or functions. These blocks, which may be referred to herein as units or modules or the like, may be physically implemented by analog or digital circuits, such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports, such as printed circuit boards and the like. The circuits constituting a block may be implemented by dedicated hardware, by a processor (e.g., one or more programmed microprocessors and associated circuitry), or by a combination of dedicated hardware to perform some functions of the block and a processor to perform other functions of the block. Each block provided in embodiments may be physically separated into two or more interacting and discrete blocks without departing from the scope of the inventive concepts. Likewise, the blocks provided in embodiments may be physically combined into more complex blocks without departing from the scope of the inventive concepts.

The accompanying drawings are used to help easily understand various technical features and it should be understood that embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

It should be noted that the terms "stack (ST)", "SIM", and "UE_SIM" have been used interchangeably throughout the disclosure and the drawings. Further, the terms "network" and "N/W" have been used interchangeably throughout the disclosure and the drawings.

It should be noted that even though embodiments of the present disclosure have been explained in respect of two SIMS on the MUSIM UE, the techniques of the present disclosure are also applicable to the MUSIM UE comprising more than two SIMS.

Referring now to the drawings, and more particularly to FIGS. 3 to 15, where similar reference characters denote corresponding features consistently throughout the figures, there are shown embodiments.

FIG. 3 illustrates a flow chart depicting a method 300 at a multi-subscriber identity module (MUSIM) user equipment (UE) for continuing operation of the MUSIM UE in a specific mode, in accordance with embodiments of the present disclosure. In embodiments, the method as defined in reference to FIG. 3 may be performed by the MUSIM UE. As shown in FIG. 3, at operation 301, the method may comprise indicating, by the MUSIM UE, one of: compatible band information for a first SIM and one or more second SIMS in an uplink signalling message in response to a trigger (also referred to herein as satisfaction of a trigger condition) at the MUSIM UE, or one or more other stacks serving band information associated with the one or more second SIMS of the MUSIM UE in the uplink signalling message in response to the trigger at the MUSIM UE. In the current context, the compatible band information may be a collection of band combinations that allow the UE to receive or transmit on all configured bands at the same time (or contemporaneously) utilizing various carrier components. If Band A and Band B are compatible bands, for example, the UE may receive and transmit data at the same time (or contemporaneously) by specifying Band A in carrier component-0 (C0) and Band B in carrier component-1 (C1). The compatible band information and one or more other stacks of band information facilitate in continuing operation of the MUSIM UE in the specific mode (also referred to herein as a first mode). In embodiments, let us assume that the MUSIM UE comprises two SIMs, e.g., a first SIM and a second SIM. The MUSIM UE is currently communicating using the first SIM, wherein the first SIM is connected to a first network. The second SIM is connected to a second network and is either in an idle mode or in a connected mode. Accordingly, the compatible band information may include information related to compatible frequency bands associated with the first SIM and the second SIM. For example, if frequency band A is associated with the first SIM; frequency band D is associated with the second SIM, and frequency bands A and D are compatible with each other, then the compatible band information may include the frequency bands which are compatible to the frequency bands A and D (e.g., compatible to both frequency band A and frequency band D). In embodiments, the one or more other stacks serving band information corresponds to band information related to serving frequency bands associated with the one or more second SIMS. In continuation with the above-discussed example, sending of one or more other stacks serving band information corresponds to sending frequency band D associated with the second SIM (e.g., the frequency band associated with the SIM not sending the one or more other stacks serving band information).

In embodiments, the first SIM is communicating via a first protocol stack and the one or more second SIMS are communicating via one or more second protocol stacks. Hence, the protocol stacks for each of the first SIM and the one or more second SIMs are different from each other. Further, in embodiments, the specific mode comprises a multi-transmission multi-reception mode of operation of the MUSIM UE, such as 2Tx/2Rx, 3Tx/3Rx MTx/NRx (where M, N>1) mode of operation. According to embodiments, the specific mode may include a 1Tx/2Rx or 2Tx/2Rx mode of operation.

In embodiments, the compatible band information and/or the one or more other stacks serving band information may be indicated by the MUSIM UE in an uplink signalling message sent to an associated network, such as the first network, in response to a trigger at the MUSIM UE. In embodiments, the trigger may comprise a movement of one of the first SIM and the one or more second SIMs to a connected mode or in response to detecting a change in serving band information of any of the first SIM or the one or more second SIMs, which has been further explained in reference to FIGS. 4 and 5. In embodiments, the trigger may comprise a request received from a network to obtain, from the MUSIM UE, one or more bands compatible with at least one of a carrier aggregation (CA) and/or a dual connectivity (DC) for continuing operation of the MUSIM UE in the specific mode, which has been further explained in reference to FIGS. 6A-6D. In embodiments, the MUSIM UE may trigger performing a measurement report (MR) associated with an RRC reconfiguration signalling message to continue the operation of the MUSIM UE in the specific mode, wherein the measurement report comprises an optional information element (IE) indicating the specific mode preferred cell as true. In embodiments, the measurement report may be triggered by one of the following operations.

a. Trigger the measurement report based on UE specific evaluation, as described in conjunction with FIG. 7 for a normal handover process and/or FIG. 8 for a conditional handover process;

b. Trigger the measurement report indicating one or more other stacks band information, as described in conjunction with FIG. 9; and/or c. Trigger the measurement report with the preferred band information, as described in conjunction with FIGS. 10-12.

Referring back to FIG. 3, at operation 303, the method 300 may include receiving, by the MUSIM UE from a network, an RRC reconfiguration signalling message for performing at least one activity at the first SIM in response to the indication of one of the compatible band information or the one or more other stacks serving band information (e.g., in response to the uplink signalling message). In continuation with the example discussed in reference to operation 301, the MUSIM UE may receive the RRC reconfiguration signalling message from the first network in response to the indication transmitted at operation 301. The RRC reconfiguration signalling message may include information related to at least one activity (e.g., triggering measurement report, configuring the first SIM, etc.) that is to be performed by the first SIM.

In embodiments, the RRC reconfiguration signalling message may comprise a plurality of measurement objects with no associated priority defined by the network, wherein the RRC reconfiguration signalling message is received for the first SIM. Accordingly, the MUSIM UE may prioritize measurement associated with one or more compatible measurement objects among the plurality of measurement objects that are compatible with serving bands of the other SIMs (e.g., the second SIM). The compatibility of the one or more measurement objects is determined based on the compatibility with one or more other stacks serving band information of the one or more second SIMs (and/or the compatible band information of the first SIM). Further, the MUSIM UE may perform measurements for the one or more compatible measurement objects in response to determining that a cell is available and a signal strength for the available cell (e.g., with respect to one or more cells associated with the one or more compatible measurement objects) is above a predefined (or alternatively, given) measurement threshold for the one or more compatible measurement objects. However, if no band corresponding to the plurality of measurement objects is compatible with the serving bands of one or more second SIMS, or the signal strength for the available cell is not above the predefined (or alternatively, given)

measurement threshold for the one or more compatible measurement objects, then the MUSIM UE may perform measurements for the one or more compatible measurement objects and/or one or more non-compatible measurements objects. This example is further explained in detail in reference to FIGS. 6C-6D and 7. According to embodiments, each of the plurality of measurement objects may represent a respective cell and a respective frequency band of the respective cell. According to embodiments, the MUSIM UE may determine whether one or more cells associated with the one or more compatible measurement objects are available and whether one or more respective signal strengths corresponding to the one or more cells satisfy the predefined (or alternatively, given) measurement threshold.

In embodiments, the RRC reconfiguration signalling message may comprise a conditional handover (CHO) configuration. Accordingly, the MUSIM UE may prioritize connecting to a target primary cell with a band compatible with one or more second SIMS. The target primary cell is defined in a list of a plurality of target cells received from the network in the RRC reconfiguration signalling message. The compatibility of the target cell is determined based on the compatibility with one or more other stacks serving band information of the one or more second SIMS, for continuing the specific mode of operation. The MUSIM UE may then trigger the RRC reconfiguration complete signalling message to the target primary cell on the compatible band, if the signal strength of the target primary cell is above the predefined (or alternatively, given) measurement threshold. However, if the signal strength of the target primary cell is below the predefined (or alternatively, given) measurement threshold, then the MUSIM UE may trigger the RRC configuration complete signalling message to one of the plurality of target cells other than the target primary cell. According to embodiments, the MUSIM UE may determine whether the signal strength of the target primary cell is above the predefined (or alternatively, given) measurement threshold. This example is further explained in detail in reference to FIG. 8.

Referring back to FIG. 3, at operation 305, the method 300 may include performing, by the MUSIM UE, the at least one activity based on the RRC reconfiguration signalling message received from the network. In continuation with the example discussed in reference to operation 301, the MUSIM UE through the first SIM may perform the at least one activity based on the RRC reconfiguration signalling message received from the first network at operation 303. In embodiments, performing the at least one activity based on the RRC reconfiguration signalling message may comprise configuring the first SIM, to connect with a primary cell compatible with serving bands of the first SIM and the one or more second SIMS. The compatibility of the primary cell is determined based on the compatible band information of the first SIM and/or the one or more other stacks serving band information of the one or more second SIM.

In embodiments, performing the at least one activity based on the RRC reconfiguration signalling message may comprise configuring the first SIM, to connect with one or more secondary cells compatible with serving bands of the first SIM and the one or more second SIMS. The compatibility of the one or more secondary cells is determined based on the compatible band information of the first SIM and/or the one or more other stacks serving band information of the one or more second SIMS. This example is further explained in reference to FIG. 12.

In embodiments, performing the at least one activity based on the RRC reconfiguration signalling message may comprise configuring the first SIM, to connect with a primary cell on a secondary cell group (SCG) compatible with serving bands of the first SIM and the one or more second SIMS. The compatibility of the primary cell is determined based on the compatible band information of the first SIM and/or the one or more other stacks serving band information of the one or more second SIMS.

In embodiments, performing the at least one activity based on the RRC reconfiguration signalling message may comprise configuring the first SIM, to connect with one or more secondary cells on the SCG compatible with serving bands of the first SIM and the one or more second SIMS. The compatibility of the one or more secondary cells is determined based on the compatible band information of the first SIM and the one or more other stacks serving band information of the one or more second SIMS. This example is further explained in reference to FIG. 5.

Figure 7:
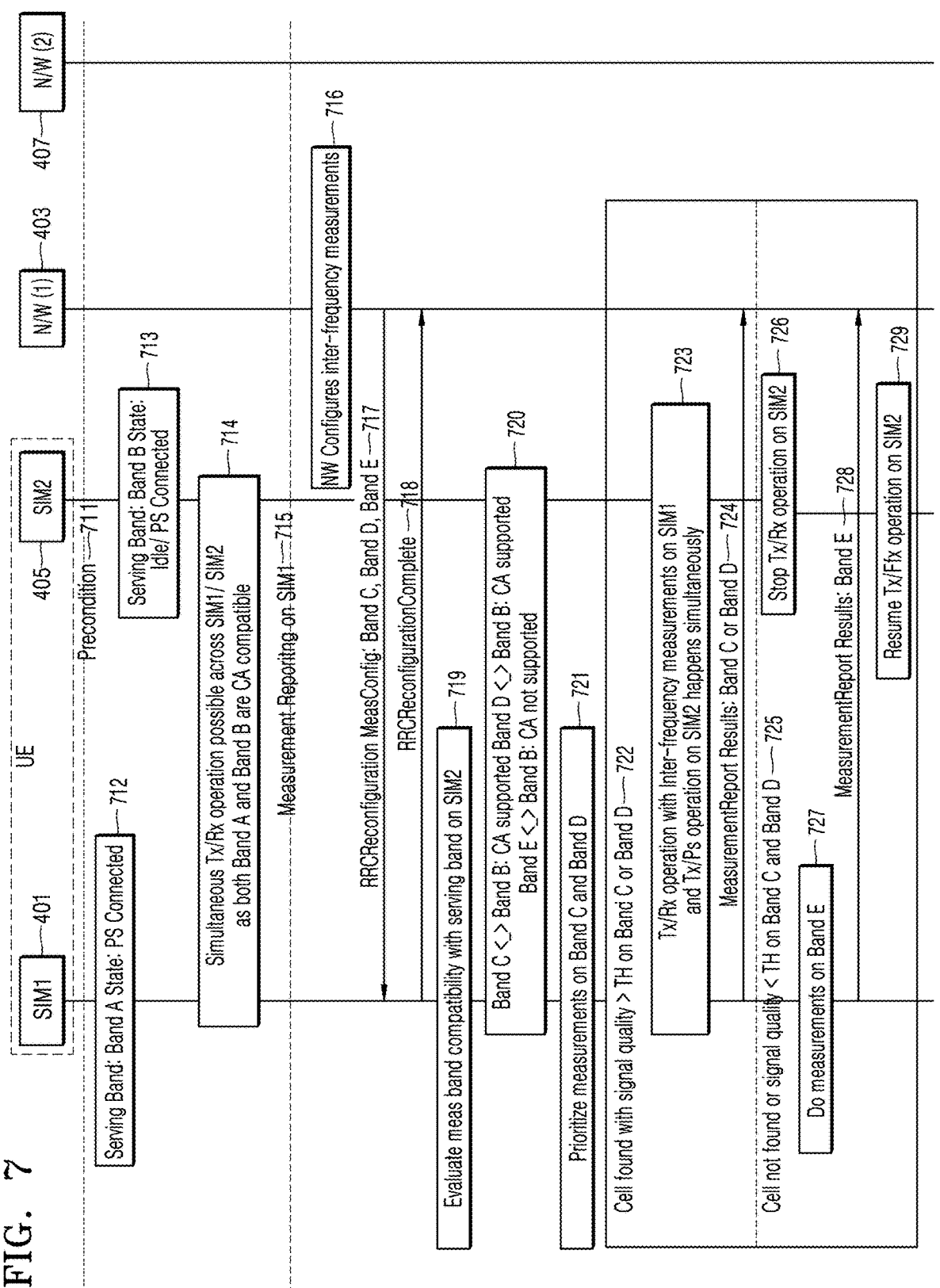
FIG. 7 illustrates a scenario of retaining the specific mode by prioritizing measurement reports for compatible bands, in accordance with embodiments of the present disclosure.

In embodiments, performing the at least one activity based on the RRC reconfiguration signalling message may comprise configuring the first SIM, to measure one or more measurement objects compatible with serving bands of the one or more second SIMs, as explained in reference to FIG. 7.

In embodiments, performing the at least one activity based on the RRC reconfiguration signalling message may comprise configuring the first SIM, to measure one or more measurement objects with an associated priority, wherein the MUSIM UE is configured to trigger measurement (e.g., prioritize measurement, and trigger and/or perform measurement based on the priorities) on a first measurement object with a higher priority over measurement on a second measurement object with a lower priority. The first measurement object is configured with a band compatible with the one or more second SIMS and the second measurement object is configured with a band not compatible with the one or more second SIMS. This example is further explained in reference to FIGS. 6C-6D.

In embodiments, performing the at least one activity based on the RRC reconfiguration signalling message may comprise configuring the first SIM with one of a higher-priority measurement object and/or a lower-priority measurement object. Thereafter, the MUSIM UE may trigger a measurement report associated with the higher-priority measurement object in response to determining an availability of a cell associated with the high-priority measurement object and determining that the measured cell (e.g., a measured signal strength of the cell) satisfies a predefined (or alternatively, given) measurement threshold. However, if either the cell associated with the higher-priority measurement object is not available or the measured cell does not satisfy the predefined (or alternatively, given) measurement threshold, the MUSIM UE may trigger the measurement report associated with the lower-priority measurement object. According to embodiments, the MUSIM UE may determine whether the cell associated with the higher-priority measurement object is available and satisfies the predefined (or alternatively, given) measurement threshold. This example is further explained in reference to FIGS. 6C-6D. FIG. 3 is further explained in reference to FIGS. 4-12 below.

According to embodiments, after performing the at least one activity, the MUSIM UE may generate a communication signal (e.g., modulate, encode, etc.) and transmit the communication signal to a first cell (e.g., the cell to which the first SIM connects by the at least one activity, the cell the first SIM measures by the at least one activity and subsequently connects to (e.g., via a handover), etc.). According to embodiments, after performing the at least one activity, the MUSIM UE may receive communication signal from a first cell (e.g., the cell to which the first SIM connects by the at least one activity, the cell the first SIM measures by the at least one activity and subsequently connects to (e.g., via a handover), etc.) and process the received signal (e.g., decode, demodulate, etc.).

Figure 4:
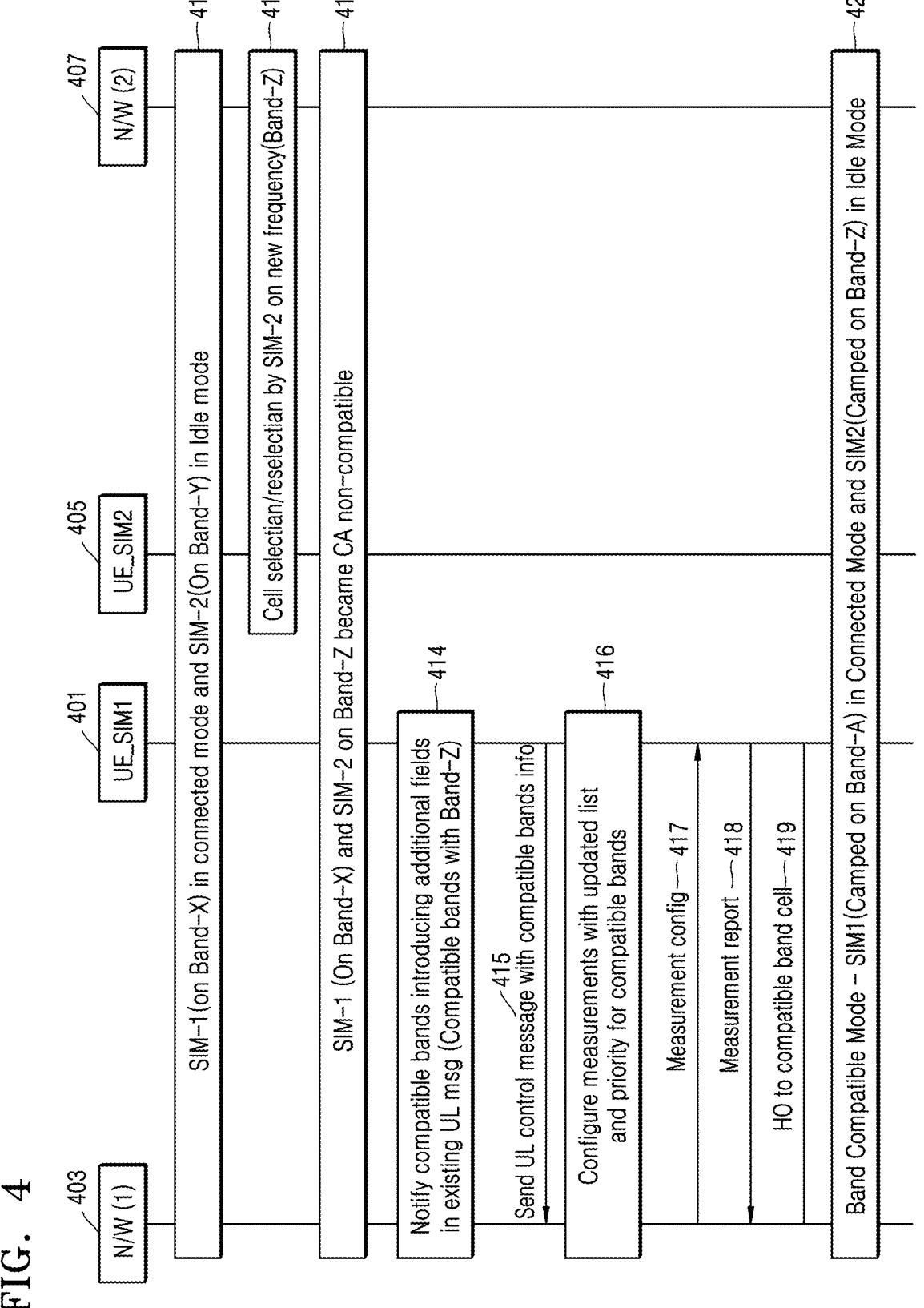
FIG. 4 illustrates an example scenario in which an Up Link (UL) control message with compatible bands information is used to remain in the specific mode, in accordance with embodiments of the present disclosure.

FIG. 4 illustrates an example scenario in which an Up Link (UL) control message with compatible bands information is used to remain in the specific mode, in accordance with embodiments of the present disclosure. As shown in FIG. 4, the MUSIM UE comprises two SIMS, e.g., SIM 1 (UE_SIM1) 401 (also referred to herein as SIM1 and the first SIM) connected with a first network 403 and SIM 2 (UE_SIM2) 405 (also referred to herein as SIM2 and the second SIM) connected with a second network 407. At operation 411, SIM 1 401 is in connected mode with the first network (N/W1) 403 on a frequency band-X. SIM 2 405 is in idle mode with the second network (N/W2) 407 on a frequency band-Y. The MUSIM UE is in the specific mode of operation, e.g., 1Tx/2Rx or 2Tx/2Rx mode of operation as band-X and band-Y are CA compatible. At operation 412, SIM2 405 reselects to another frequency band-Z which is CA non-compatible with the band-X on SIM1 401. Accordingly, at operation 413, SIM1 401 and SIM2 405 become CA non-compatible. Because of the CA non-compatibility, the MUSIM UE would have fallen back to 1Tx/1Rx mode as per prior art. However, in accordance with the techniques of the present disclosure, to avoid falling back to the 1Tx/1Rx mode (or reduce a frequency of occurrence thereof), SIM1 401 which is in connected mode, indicates to the first network 403 information about its preference (and/or configuration) to operate in 1Tx/2Rx or 2Tx/2Rx mode by sending an uplink message along with the compatible band information, e.g., which bands that are supported by SIM1 401 which are compatible with band-Z, at operations 414 and 415. Accordingly, at operation 416, the first network 403 may configure the available frequency bands based on the received compatible band information for measurement on the first SIM 401. In particular, at operation 417, the SIM1 401 may receive the RRC reconfiguration signalling message comprising the measurement configurations for the compatible bands from the first network 403. Accordingly, at operation 418, the SIM1 401 may perform the measurement for the compatible bands and may share corresponding measurement reports (MR) with the first network 403. Based on the MR, at operation 419, the first network 403 may instruct the first SIM 401 to hand over to another frequency (e.g., Band-A) which is 1Tx/2Rx or 2Tx/2Rx compatible with Band-Z. Hence, at operation 420, the MUSIM UE remains in the specific mode, e.g., 1Tx/2Rx or 2Tx/2Rx mode of operation.

Figure 5:
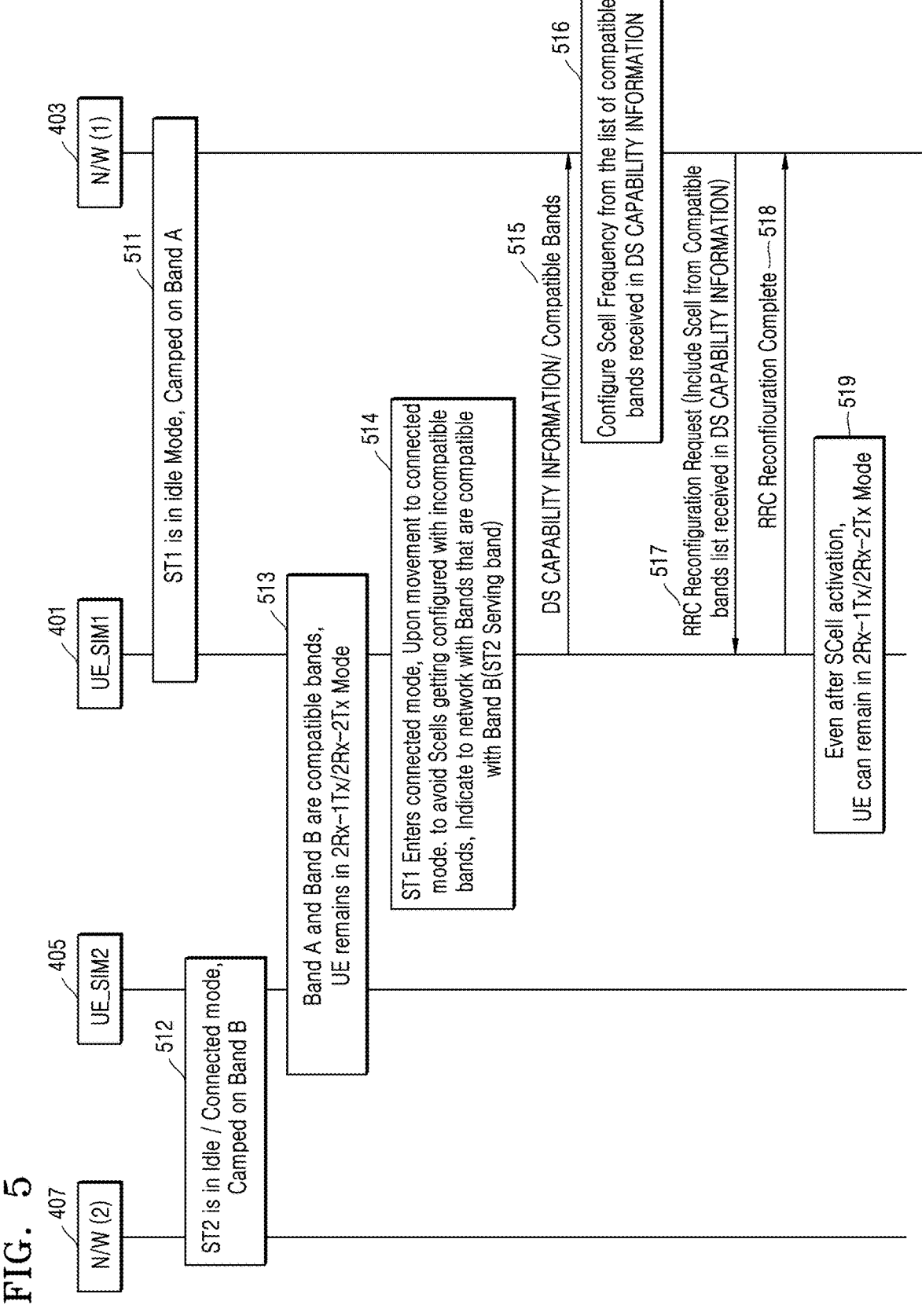
FIG. 5 illustrates an example scenario in which a Dual SIM (DS) capability information message with compatible bands information is used to remain in the specific mode in the event of a movement of a SIM in a connected mode, in accordance with embodiments of the present disclosure.

FIG. 5 illustrates an example scenario in which a DS capability information message with compatible bands information is used to remain in the specific mode in the event of a movement of a SIM in a connected mode, in accordance with embodiments of the present disclosure. As shown in FIG. 5, the MUSIM UE comprises two SIMS, e.g., SIM1 (UE_SIM1/ST1) 401 connected with a first network 403 and SIM2 (UE_SIM2/ST2) 405 connected with a second network 407. At operation 511, SIM 1 401 is in idle mode with the first network (N/W1) 403 on a frequency band A. At operation 512, SIM 2 may be in idle mode or connected mode with the second network (N/W2) 407 on a frequency band B. At operation 513, the MUSIM UE is in the specific mode of operation, e.g., 1Tx/2Rx or 2Tx/2Rx mode of operation as band A and band B are compatible with each other. At operation 514, SIM1 405 moves to (e.g., switches to, enters, etc.) connected mode. At operation 515, SIM 1 indicates compatible band information, e.g., bands compatible with band B on SIM2 via the uplink signalling message, such as a Dual SIM (DS) capability information to the first network 403. This is done to ensure future Secondary cell (Scell) or Secondary Cell Group (SCG) configurations, received from the first network 403 are compatible frequencies with band B. Accordingly, at operation 516, the first network 403 may configure a primary cell and/or one or more secondary cells from the plurality of Scells or SCG Configuration which is compatible with band B. Accordingly, at operation 517, SIM1 401 may receive the RRC reconfiguration signalling message with the Scell configuration or SCG Configuration, and accordingly, SIM1 may be configured with the Scells or SCG which is compatible with band B. In embodiments, SIM1 may be configured to connect with one or more secondary cells from the SCG which are compatible with band B. At operation 518, the SIM1 401 may respond with an RRC reconfiguration complete message. In embodiments, the RRC reconfiguration complete message may indicate that the SIM1 401 is connected to the Scell or SCG which is compatible with Band B. Hence, at operation 519, the MUSIM UE remains in the specific mode, e.g., 1Tx/2Rx or 2Tx/2Rx mode of operation.

Figure 6A:
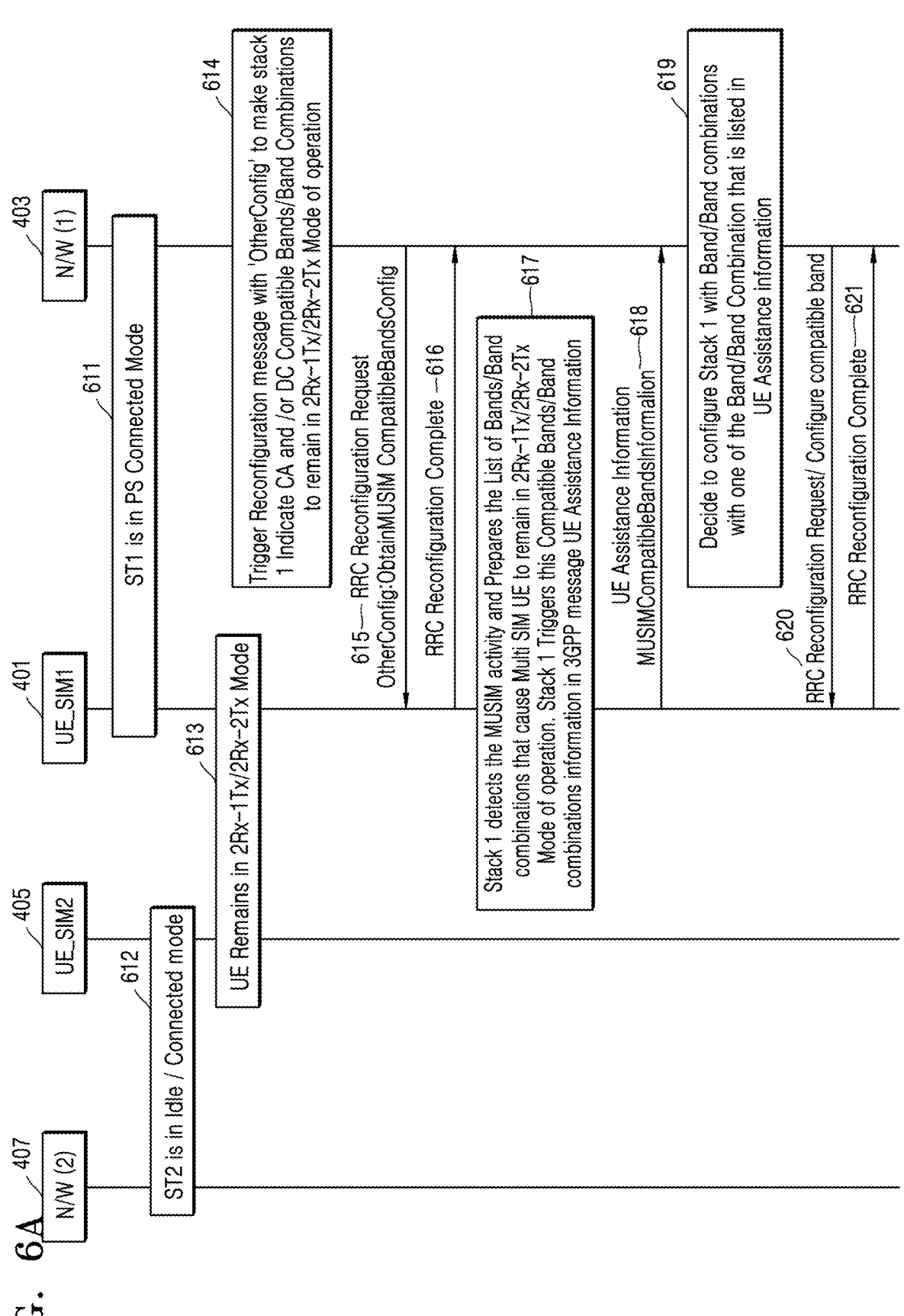

FIGS. 6A-6D illustrate various scenarios of retaining the specific mode in case of a handover, in accordance with embodiments of the present disclosure. As shown in FIG. 6A, the MUSIM UE comprises two SIMs, e.g., SIM1 (UE_SIM1/ST1) 401 connected with a first network 403 and SIM2 (UE_SIM2/ST2) 405 connected with a second network 407. At operation 611, SIM 1 401 is in the PS connected mode with the first network (N/W1) 403. At operation 612, SIM 2 is in idle mode/Connected mode (e.g., idle mode or connected mode) with the second network (N/W2) 407. At operation 613, the MUSIM UE is in the specific mode of operation, e.g., 1Tx/2Rx or 2Tx/2Rx mode of operation. The first network 403 is aware that SIM1 401 is part of multi-SIM capable UE and configures SIM1 401 with 'OtherConfig' information element (IE) in an RRC reconfiguration request message to make SIM1 indicate CA and/or dual connectivity (DC) compatible bands/band combinations to make the UE remain in the specific mode, e.g., 1Tx/2Rx or 2Tx/2Rx mode of operation. In particular, at operation 614, SIM 1 receives the RRC reconfiguration request message with the 'OtherConfig' IE. In embodiments, the 'OtherConfig' IE may have the following contents as shown below in Table-1.

TABLE 1

```
-- ASN1START
-- TAG-OTHERCONFIG-START

.
.
.

ObtainMUSIMCompatibleBandsConfig-r16 ::=      SEQUENCE {
ObtainMUSIMCompatibleBands-r16                ENUMERATED {setup}
```

TABLE 1-continued

```
OPTIONAL -- Need M
}
  -- TAG-OTHERCONFIG-STOP
-- ASN1STOP
```

In particular, using the "ObtainMUSIMCompatible-Bands" in the "'OtherConfig' IE", the first network 403 provides a provision to the MUSIM UE to indicate one or more bands compatible with CA and/or DC to make the MUSIM UE remain in the specific mode, e.g., 1Tx/2Rx or 2Tx/2Rx mode of operation, considering the other SIM(s), e.g., SIM2 serving band/band combinations. At operation 616, SIM1 responds with the RRC reconfiguration complete message. At operation 617, SIM1 detects an occurrence of a MUSIM activity and prepares a list of Bands/Band combinations that may cause the MUSIM UE to remain in the specific mode of operation. In embodiments, the MUSIM activity may include detection of a break (e.g., an anticipated break) of the specific mode or one of the SIMS moving to (e.g., switching to, entering, etc.) connected mode. Accordingly, at operation 618, SIM1 triggers a UE Assistance information message (e.g., a 3GPP US Assistance Information message) to the first network 403 with an MUSIM-CompatibleBandsInformation IE. In embodiments, the UE Assistance information message may have the following contents as shown below in Table-2.

compatible bands, it is possible that SIM1 401 may not find any cell satisfying a predetermined (or alternatively, given) criteria or there may be no cells available from the compatible band list in the current location of the MUSIM UE. In embodiments, the predetermined (or alternatively, given) criteria may include measurements of the cell being less than one of a THRESHOLD_reference signal received power (RSRP), a THRESHOLD_reference signal received quality (RSRQ) and/or a THRESHOLD_signal to interference plus noise ratio (SINR), and/or a number of negative acknowledgment (NACK) in an L2 level being greater than a THRESHOLD_NACK. It should be noted that the THRESHOLD_RSRP, THRESHOLD_RSRQ, THRESHOLD_SINR, and/or THRESHOLD_NACK may be defined by the network(s) associated with the MUSIM UE. Hence, if no measurement results from the compatible bands are received from SIM1 for a predefined (or alternatively, given) amount of time and/or if the predetermined (or alternatively, given) criteria are not satisfied, then the first network 403 may decide (e.g., determine) to configure (and/or may configure) other band cells, which may not be CA/DC compatible bands.

TABLE 2

```
SL-UE-AssistanceInformationNR-r16 ::= SEQUENCE (SIZE (1..maxNrofTrafficPattern-
r16)) OF TrafficPatternInfo-r16
TrafficPatternInfo-r16::=              SEQUENCE {
trafficPeriodicity-r16                ENUMERATED {
ms20,ms50, ms100, ms200, ms300, ms400, ms500, ms600, ms700, ms800, ms900,
ms1000},
timingOffset-r16                      INTEGER (0..10239)         OPTIONAL,
messageSize-r16                       BIT STRING (SIZE (8))      OPTIONAL,
sl-QoS-FlowIdentity-r16               SL-QoS-FlowIdentity-r16    OPTIONAL
  }
MUSIMCompatibleBandsInformation-r16::=         SEQUENCE {
compatibleBandCombinationList-r16              CompatibleBandCombinationList  -r16
OPTIONAL,
  }
-- TAG-UEASSISTANCEINFORMATION-STOP
-- ASN1STOP
```

In particular, using the "compatibleBandCombination-List", SIM1 401 may send the list of CA and/or DC compatible bands/band combinations that may cause the MUSIM UE to remain in the specific mode of operation. At operation 619, based on the UE assistance information received from SIM1 401, the first network 403 may decide (e.g., determine) to configure (and/or may configure) SIM1 401 with band/band combinations with one of the band/band combinations from the list shared in the UE assistance information. In particular, the RRC reconfiguration at operation 620 may be configuring a new cell to which UE would be handed over or it could be for Scell/SCG configuration. At operation 621, SIM1 401 responds with an RRC reconfiguration complete message, and the MUSIM UE remains in the specific mode, e.g., 1Tx/2Rx or 2Tx/2Rx mode of operation.

Figure 6B:
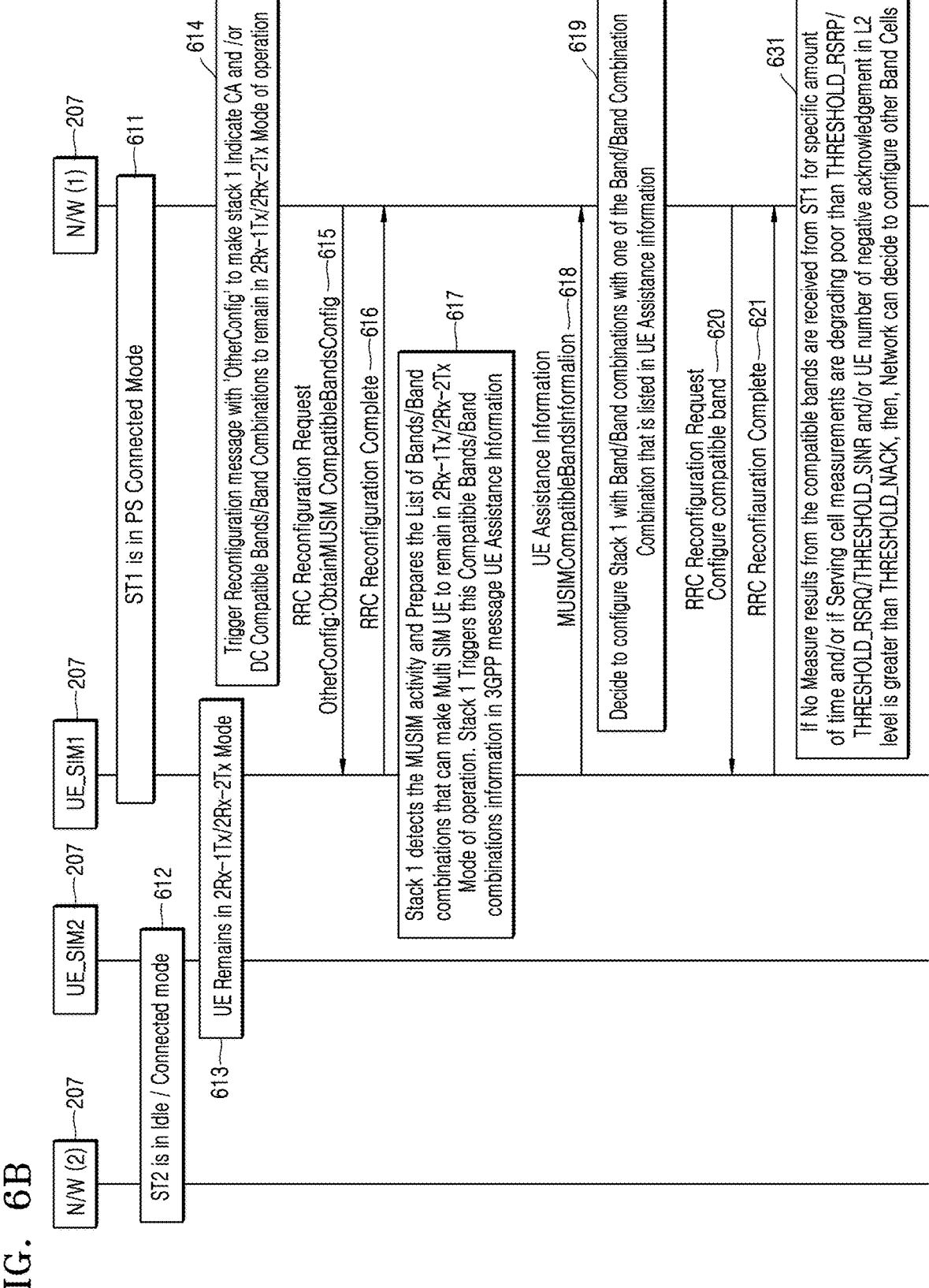

Moving to FIG. 6B, it may be noted that operations 611-621 are the same as (or similar to) operations 611-621 of FIG. 6A. Hence, a description of the same is omitted for the sake of brevity of the specification. At operation 631, after the first network 403 configures SIM1 401 with the Moving to FIGS. 6C-6D, it may be noted that operations 611-618 are the same as (or similar to) operations 611-618 of FIG. 6A. Hence, a description of the same is omitted for the sake of brevity of the specification. at operation 641, after the first network 403 receives the UE ASSISTANCE INFORMATION message with the compatible band combinations, the first network may decide (e.g., determine) to send the reconfiguration message with measurement objects with priority information. In particular, compatible bands measurement objects also referred to as first measurement objects may be configured with higher-priority and other measurement objects also referred to as second measurement objects may be configured with lower-priority. Accordingly, at operation 642, the reconfiguration message is triggered with measurement objects with corresponding priorities, e.g., bands C and D are compatible with band B, hence they have higher-priority and band E is not compatible with band B, hence it has lower-priority. At operation 643, SIM1 401 sends RRC reconfiguration complete message to the first network 403. At operation 644, the MUSIM UE may decide to prioritize (e.g., may prioritize) the measurements for higher-priority measurement objects over low-priority measurement objects, e.g., prioritize the measurements for bands C and D over band E. In embodiments, the MUSIM UE may perform the measurement only on the higher-priority measurement objects for a specific amount of time (e.g., an amount of time defined by the UE). In embodiments, the MUSIM UE may perform the measurement on the higher-priority measurement objects only upon determining that a cell associated with the higher-priority measurement object, e.g., a cell associated with bands C or D is available and that the measured cell satisfies a predefined (or alternatively, given) measurement threshold. In embodiments, the predetermined (or alternatively, given) measurement threshold may include measurements of the cell being less than one of the THRESHOLD_RSRP, the THRESH-OLD_RSRQ and/or the THRESHOLD_SINR, and/or a number of NACKs in the L2 level being greater than the THRESHOLD_NACK. It should be noted that the THRESHOLD_RSRP, THRESHOLD_RSRQ, THRESH-OLD_SINR, and/or THRESHOLD_NACK may be defined by the network(s) associated with the MUSIM UE. In embodiments, the predetermined (or alternatively, given) measurement threshold may also include a predetermined (or alternatively, given) time period defined by the MUSIM UE. However, if either the cell associated with the higher-priority measurement object is not available or the measured cell does not satisfy the predefined (or alternatively, given) measurement threshold, the MUSIM UE may trigger the measurement report associated with the lower-priority measurement object, e.g., band E.

FIG. 7 illustrates a scenario of retaining the specific mode by prioritizing measurement reports for compatible bands, in accordance with embodiments of the present disclosure. Operation 710 is a precondition that is explained with reference to operations 712-714 (e.g., operation 710 may refer to the precondition represented by operations 712-714). At operation 712, SIM1 401 is in PS connected state on a serving band A with a first network 403. At operation 713, SIM2 405 is either in idle mode or the PS connected state on a serving band B with a second network 407. Serving band, A on SIM1 401 is CA compatible with serving band B on SIM2, and hence simultaneous (or contemporaneous) Tx/Rx operation is possible. So, at operation 714, the MUSIM UE is operating in the specific mode, e.g., 2Tx/2Rx or 1Tx/2Rx mode. Operation 715 defines measurement reporting on SIM1 401, which is explained with reference to operations 716-729 (e.g., operation 715 may refer to the precondition represented by operations 716-729). At operation 716, the first network 403 configures inter-frequency measurements on bands C, D, and E by sending the RRC reconfiguration message to SIM1 401 at operation 717. The bands C and D are CA compatible with band B, whereas band E is not CA compatible with band B. At operation 718, SIM1 401 sends the RRC reconfiguration complete message. At operation 719, the MUSIM UE on SIM1 401 evaluates band compatibility between these inter-frequency bands on SIM1 401 with a serving band on SIM2. At operation 720, the MUSIM UE determines that bands C and D are CA compatible with serving band B of SIM2 405, whereas band E is not CA compatible with serving band B of SIM2 405. Accordingly, at operation 721, the MUSIM UE on SIM1 401 prioritizes measurements on one or more measurement objects compatible with bands A and B, such as measurement objects of bands C and D as they are CA compatible with the SIM2 Serving band. This happens along with simultaneous (or contemporaneous) Tx/Rx operation on SIM2. The MUSIM UE is still in the specific mode of operation. In embodiments, the MUSIM UE may perform the measurement on compatible bands C and/or D only upon determining that a cell associated with the compatible band C and/or D is available and that the measured cell satisfies a predefined (or alternatively, given) measurement threshold. In embodiments, the predetermined (or alternatively, given) measurement threshold may include measurements of the cell being less than one of the THRESHOLD_RSRP, THRESHOLD_RSRQ, and/or THRESHOLD_SINR. In embodiments, the predetermined (or alternatively, given) measurement threshold may be determined by the UE or predefined (or alternatively, given) by the UE. In embodiments, the predetermined (or alternatively, given) measurement threshold may also include a predetermined (or alternatively, given) time period defined by the MUSIM UE. However, if either the cell associated with the band C and/or D is not available or the measured cell does not satisfy the predefined (or alternatively, given) measurement threshold, the MUSIM UE may trigger the measurement report associated with the non-compatible band E. For example, as shown in FIG. 7, at operation 722, the MUSIM UE determines that the cell associated with compatible band C or D has a measurement threshold greater than the predetermined (or alternatively, given) measurement threshold. Accordingly, at operation 723, Tx/Rx operation with inter-frequency measurements on SIM1 401 and Tx/Rx operation on SIM2 405 happens simultaneously (or contemporaneously). Then, at operation 724, SIM1 401 sends MR of compatible band C and/or D to the first network 403. However, at operation 725, if it is determined that either the cell associated with the compatible band C and/or D is not available or the measured cell does not satisfy the predefined (or alternatively, given) measurement threshold, then at operation 726, Tx/Rx operation is stopped on SIM2 405. Then, at operation 727, the MUSIM UE triggers measurement reporting associated with the non-compatible band E. Accordingly, at operation 728, SIM1 401 sends an MR of band E to the first network 403. Then, at operation 729, Tx/Rx operation is resumed on SIM2 405.

Figure 8:
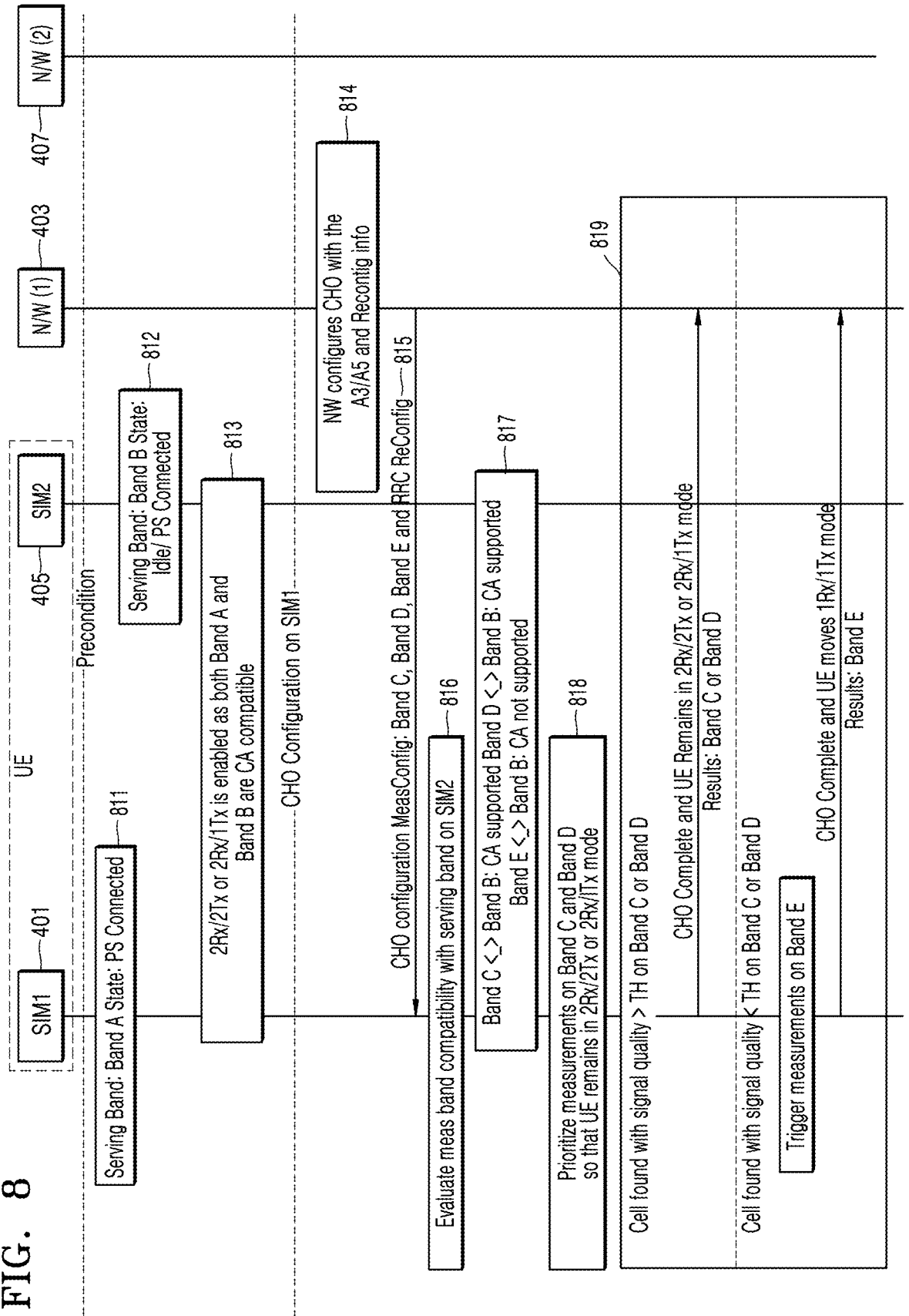
FIG. 8 illustrates a scenario of retaining the specific mode in case of a conditional handover (CHO), in accordance with embodiments of the present disclosure.

FIG. 8 illustrates a scenario of retaining the specific mode in case of a conditional handover (CHO), in accordance with embodiments of the present disclosure. As shown in FIG. 8, the MUSIM UE comprises two SIMs, e.g., SIM1 (UE_SIM1) 401 connected with a first network 403 and SIM2 (UE_SIM2) 405 connected with a second network 407. At operation 811, SIM 1 401 is in PS connected mode with the first network (N/W1) 403 on a frequency band A. SIM 2 405 is also in connected mode with the second network (N/W2) 407 on a frequency band B at operation 812. At operation 813, the MUSIM UE is in the specific mode of operation, e.g., 1Tx/2Rx or 2Tx/2Rx mode of operation as band A and band B are CA compatible. At operation 814, the first network 403 configures (e.g., determines) the CHO configuration with (e.g., to correspond to) cells from bands C, D, and E with measurement and reconfiguration information. The bands C and D are CA compatible with band B, whereas band E is not CA compatible with band B. Accordingly, at operation 815, the MUSIM UE may receive the RRC reconfiguration signalling message comprising the configuration for the CHO handover. In embodiments, the RRC reconfiguration signalling message may also include a list of a plurality of target cells for the CHO. The list of the plurality of target cells may also define one or more target primary cells where the defined one or more target primary cells are compatible with the SIM2 405. For example, the list may identify cells associated with bands C, D, and E as target primary cells. Accordingly, at operation

816, SIM1 401 performs the measurement for the CHO configuration. At operation 817, the SIM1 401 may determine that bands C and D are CA-compatible, whereas band E is not CA-compatible. Then, at operation 818, SIM1 401 prioritizes measurement and CHO on bands C and D as these bands are CA compatible, as shown at operation 819. In embodiments, SIM1 401 may perform the CHO on bands C and/or D only upon determining that a signal strength of the target primary cell, e.g., a cell associated with the compatible band C and/or D is above the predefined (or alternatively, given) measurement threshold. However, if SIM1 401 determines that the signal strength of the target primary cell is below the predefined (or alternatively, given) measurement threshold, then SIM1 may trigger measurement on cell(s) other than the target primary cell, such as a cell associated with band E, and may complete the CHO on band E.

Figure 9:
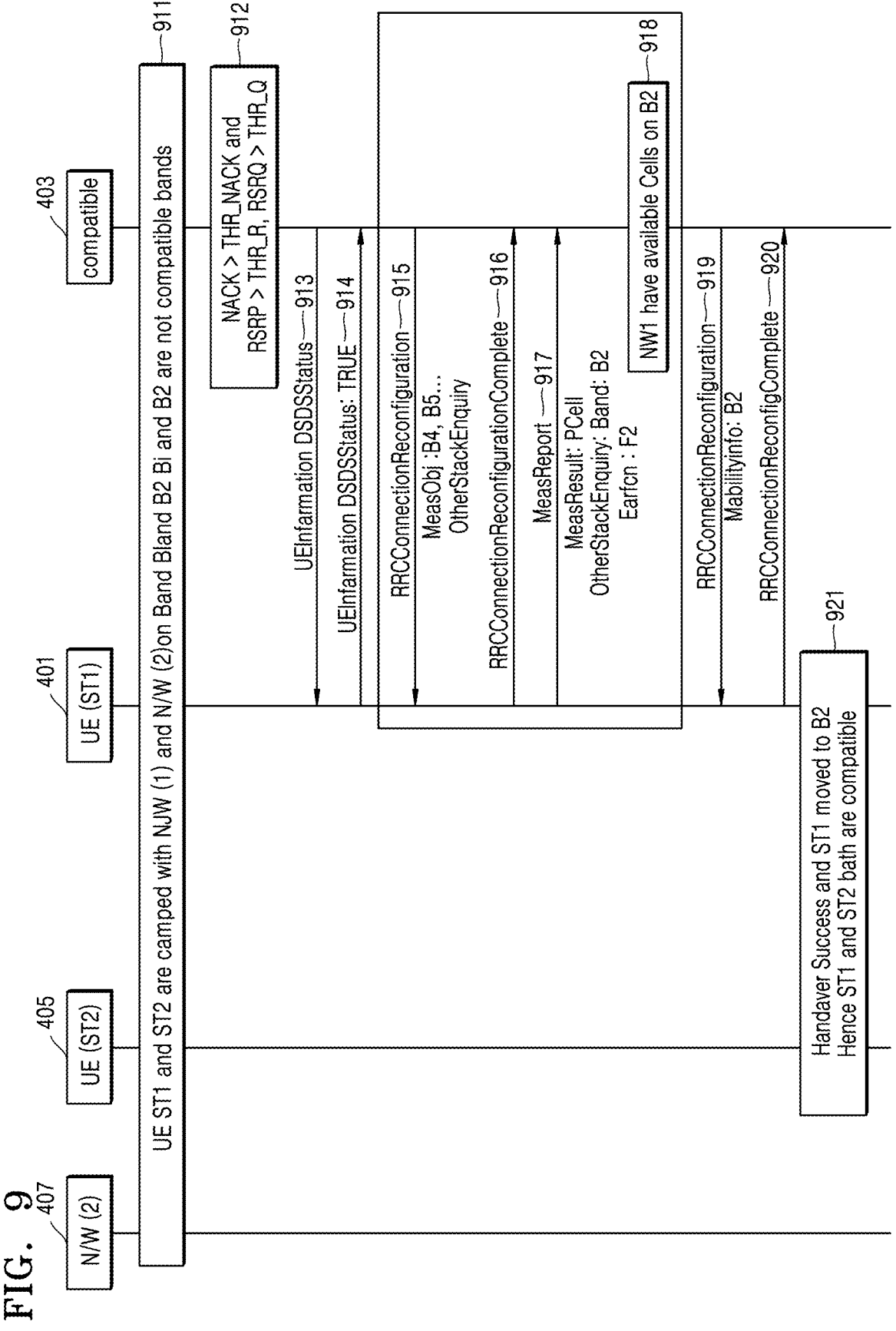
FIG. 9 illustrates an example scenario in which a measurement report with one or more stacks serving band information is used to remain in the specific mode in case of a handover (HO), in accordance with embodiments of the present disclosure.

FIG. 9 illustrates an example scenario in which a measurement report with one or more stacks serving band information is used to remain in the specific mode in case of a handover (HO), in accordance with embodiments of the present disclosure.

At operation 911, SIM1 401 is connected with a first network 403 and is camped on a band B1. SIM2 405 is connected with a second network 407 and is camped on a band B2. B1 and B2 are not compatible bands. At operation 912, the first network 403 is monitoring acknowledgment (ACK)/NACK and signal strength of the SIM1 401, e.g., determining whether the signal strength is above the predetermined (or alternatively, given) measurement threshold and the number of NACKs is greater than the THRESHOLD_NACK. If yes, then at operation 913, the first network 403 determines that the signal conditions of SIM1 401 are good. At operation 913, the first network 403 suspects that the MUSIM UE is operating in dual-SIM dual-standby (DSDS) mode and accordingly requests for UE information to know the DSDS status of the MUSIM UE. In embodiments, the UE information may be requested by the networks in a downlink signalling message. The networks may request the UE information to know about (e.g., determine) the dual SIM capability of the UE. Specifically, the networks may trigger the UE. At operation 914, SIM1 401 responds with the UE information, by utilizing the dual SIM capability, with DSDS status as true. Hence, the first network 403 finds that DSDS is enabled at the MUSIM UE. At operation 915, the first network 403 sends the RRC reconfiguration message with Measurement object and OtherStackEnquiry, the network may use these elements (e.g., Measurement object and OtherStackEnquiry) to request that the UE provide its other stack's band information. In this message, the first network 403 may enquire about the other stack serving band information. In response, at operation 916, the MUSIM UE sends the RRC reconfiguration complete message. At operation 917, the MUSIM UE sends a measurement report which contains the OtherStackEnquiry result. With OtherStackEnquiry result, the first network 403 may know about (e.g., determine) the camping frequency band of one or more other stacks, e.g., SIM2 405. At operation 918, the first network 403 determines if any cell is available of band B2 which is compatible with the band of the one or more other stacks, or if any cell is available which is compatible with the band of one or more other stacks. Accordingly, at operation 919, the first network 403 sends the RRCConnectionReconfiguration for the mobilityinfo which contains the compatible band information including a primary cell associated with the compatible band for handover. At operation 920, the MUSIM UE sends the RRC reconfiguration complete message. At operation 921, the MUSIM UE triggers the handover at the primary cell associated with the compatible band, e.g., SIM1 401 is configured to connect with the primary cell. Accordingly, SIM1 401 and SIM2 405 are connected to compatible bands and may work together to improve the performance of the MUSIM UE.

Figure 10:
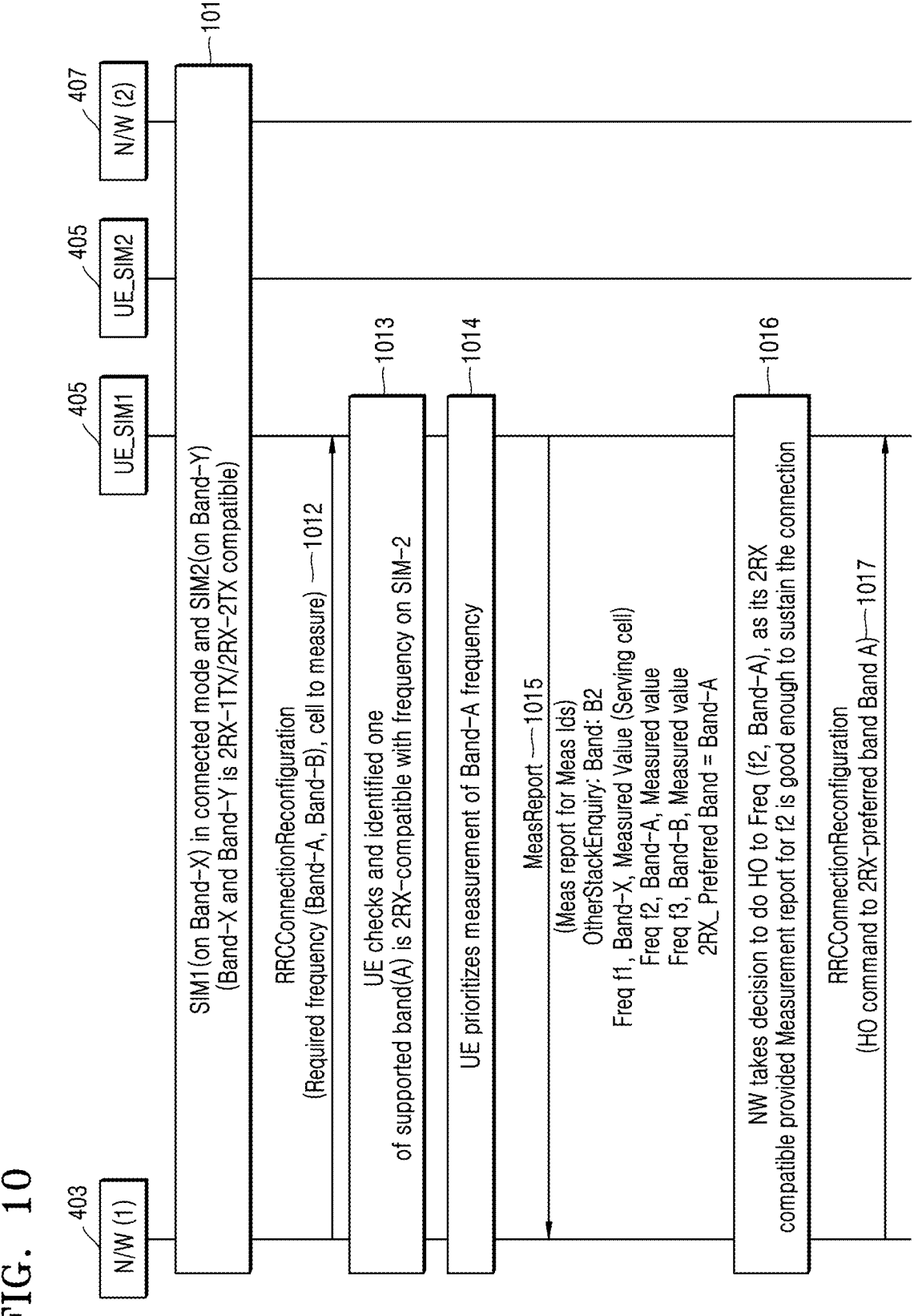
FIGS. 10-11 illustrate various scenarios which indicate preferred band information is included in the measurement report along with one or more existing results to remain in the specific mode in case of a HO, in accordance with embodiments of the present disclosure.
Figure 11:
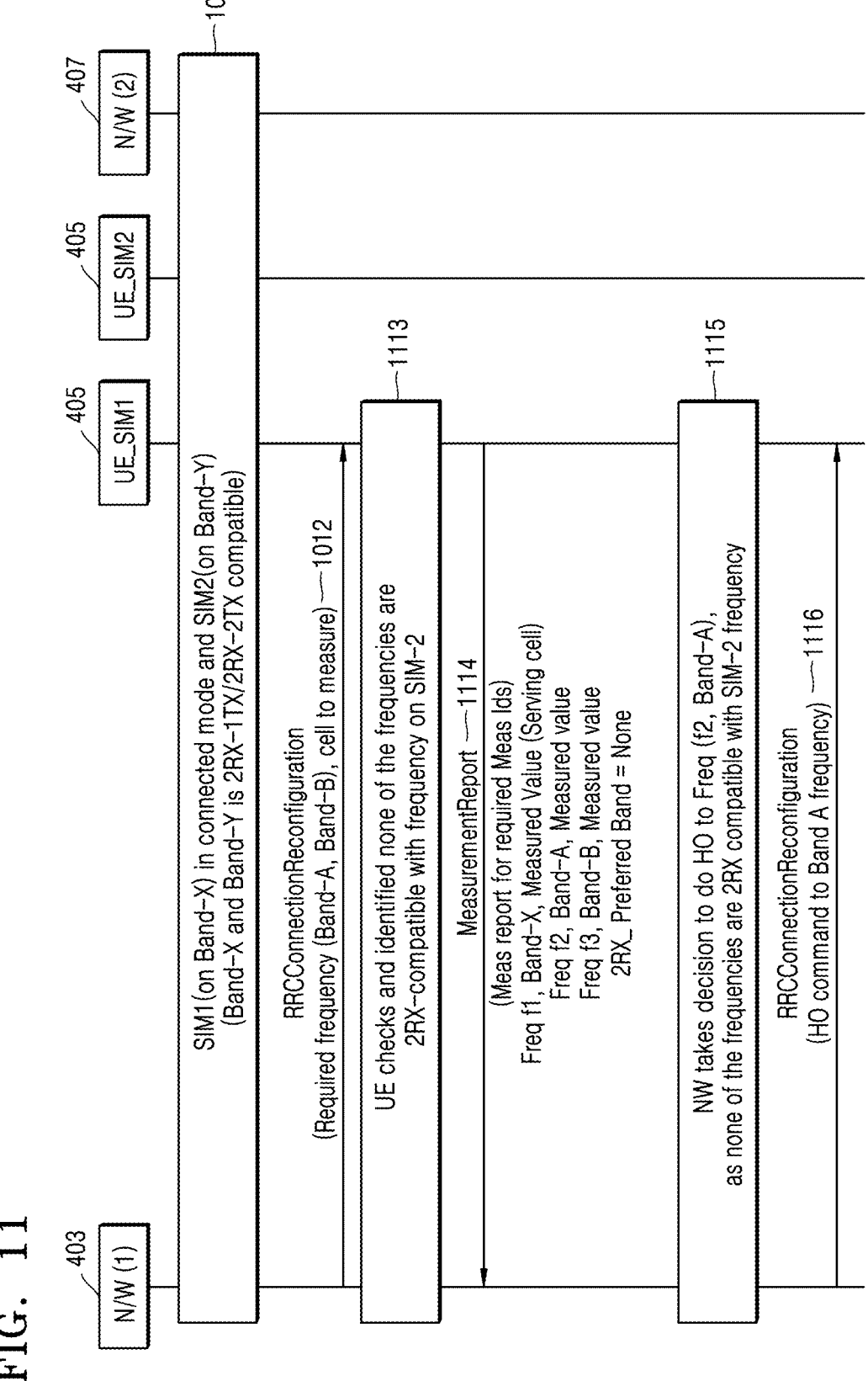

FIGS. 10-11 illustrate various scenarios which indicate preferred band information is included in the measurement report along with one or more existing results to remain in the specific mode in case of a HO, in accordance with embodiments of the present disclosure.

Referring to FIG. 10, at operation 1011, SIM1 401 is connected with a first network 403 on a band-X and SIM2 405 is connected with a second network 407 on a band-Y. The MUSIM UE is in the specific mode of operation, e.g., 1Tx/2Rx or 2Tx/2Rx mode of operation as band-X and band-Y are compatible with each other. At operation 1012, SIM1 401 receives a RRC connection reconfiguration message to perform measurement associated with band A and band B. At operation 1013, SIM1 401 identifies band A as being 1Tx/2Rx or 2Tx/2Rx compatible with frequency on SIM2 405. At operation 1014, SIM1 401 prioritizes the measurement of band A over band B and also indicates to the first network 403 that band A is a 1Tx/2Rx or 2Tx/2Rx preferred band (as used herein, an indication of a preferred band may refer to a compatible band and/or a prioritized band) for any mobility, e.g., indicates the compatible band information, which is defined in operation 1015. At operation 1015, SIM 1 401 performs measurement for the serving band, e.g., band X and prioritizes measurement for band A over band B. SIM1 401 also determines that band A is a 1Tx/2Rx or 2Tx/2Rx preferred band, and hence is a compatible band to continue the specific mode of operation. Then, at operation 1016, the first network 403 evaluates the measurement result and gives preference (e.g., priority) to the band A frequency for mobility (HO), so that 1Tx/2Rx or 2Tx/2Rx compatibility is maintained at the MUSIM UE side. Accordingly, at operation 1017, the first network 403 sends the RRC reconfiguration signalling message, such as the RRC connection reconfiguration message instructing the MUSIM UE to perform handover to a cell associated with band A. Accordingly, SIM1 401 is configured to connect to the primary cell from Band A, So SIM1 and SIM 2 remain in CA-compatible bands, and 1Tx/2Rx or 2Tx/2Rx mode is maintained.

Referring to FIG. 11, it may be seen that operations 1011 to 1012 are the same as (or similar to) operations 1011 to 1012 of FIG. 10. Hence, a description of the same is omitted for the sake of brevity of the specification. At operation 1113, SIM1 401 UE identifies that none of the measured frequencies, e.g., cells are compatible with the frequency on SIM2 405, e.g., none of the bands A and B are compatible with band Y. In particular, at operation 1114, SIM1 401 performs measurement for the serving band X and bands A and B. SIM1 401 also determines that none of the bands A and B is a 1Tx/2Rx or 2Tx/2Rx preferred band. At operation 1115, the first network 403 evaluates the measurement results and performs handover (HO) to the 1Tx/2Rx or 2Tx/2Rx non-compatible band to give more preference (e.g., greater priority) to mobility. In particular, the first network 403 evaluates the measurement results and determines that the signal strength of a cell associated with band A is greater than the signal strength of a cell associated with band B. Accordingly, the first network 403 determines to perform HO on band A. Therefore, at operation 1116, the first network 403 sends the RRC reconfiguration signalling message, such as the RRC connection reconfiguration message instructing the MUSIM UE to perform handover to a cell associated with band A, e.g., a primary cell.

Figure 12:
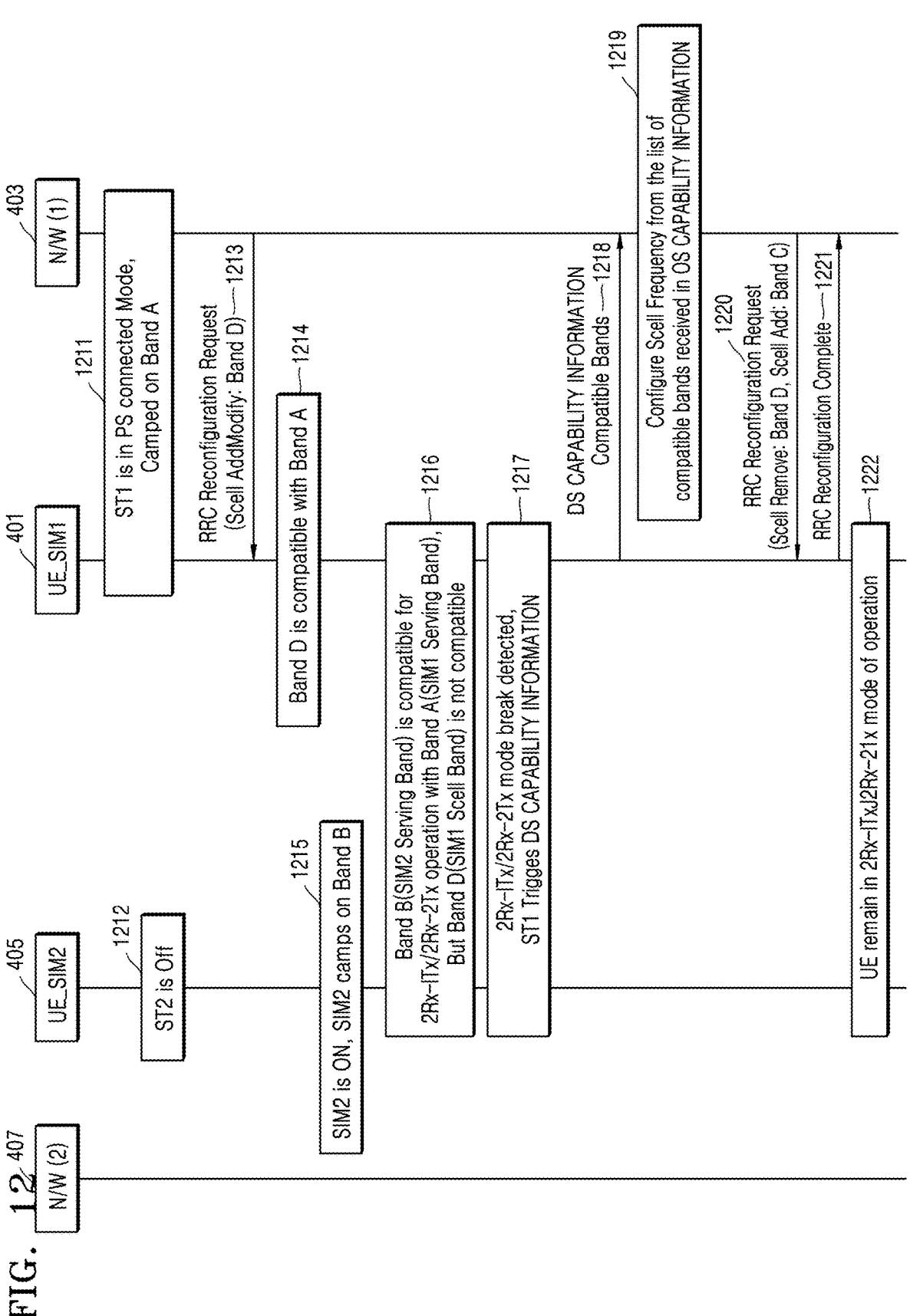
FIG. 12 illustrates a scenario of retaining the specific mode in the event of a Scell addition, in accordance with embodiments of the present disclosure.

FIG. 12 illustrates a scenario of retaining the specific mode in the event of a Scell addition, in accordance with embodiments of the present disclosure. As shown in FIG. 12, the MUSIM UE comprises two SIMS, e.g., SIM1 (UE_SIM1) 401 connected with a first network 403 and SIM2 (UE_SIM2) 405 connected with a second network 407. At operation 1211, SIM 1 401 is in PS-connected mode with the first network (N/W1) 403 on a frequency band A. At operation 1212, SIM2 405 is powered OFF. At operation 1213, the first network 403 configures a secondary cell (Scell) on band D and sends RRC Reconfiguration Request to SIM1 401. At 1214, SIM1 401 determines that band D is a compatible band (e.g., compatible with band A). At operation 1215, SIM2 405 is powered on and camps on band B. At operation 1216, it may be seen that band B is compatible with band A, but not with band D, and SIM1 would not be able to operate in the specific mode of operation, e.g., 1Tx/2Rx or 2Tx/2Rx mode of operation. At operation 1217, a break in the specific mode is detected (e.g., an anticipated break in the specific mode is detected) and SIM1 401 triggers DS capability information to indicate the compatible bands with band B on SIM2 405 at operation 1218. At operation 1219, the first network 403 configures a Scell associated with a compatible band, such as band C, from the list of compatible bands received in the DS capability information. Accordingly, at operation 1220, SIM1 401 receives the RRC reconfiguration signalling message, such as RRC Reconfiguration from the first network 403. The RRC reconfiguration signalling message may contain an instruction to remove the Scell on band D and add Scell on the compatible band, e.g., band C which is compatible with band B of SIM2 405, and Band A which is the primary cell in SIM 1 401. At operation 1221, SIM1 401 responds with an RRC Reconfiguration complete message indicating that SIM1 401 is configured to connect to the Scell on band C. Hence, at operation 1222, the MUSIM UE remains in the specific mode of operation.

Figure 13:
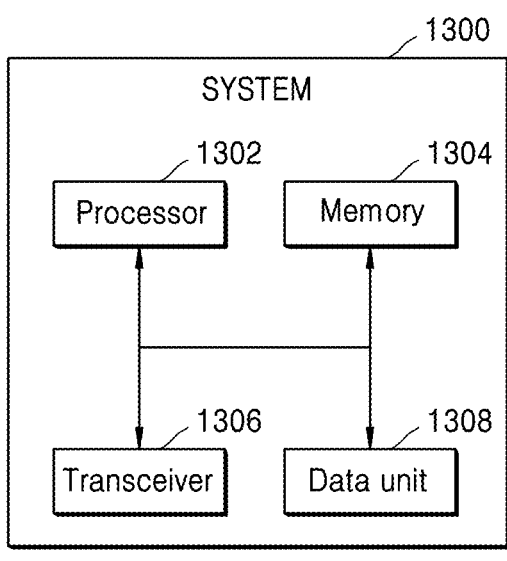
FIG. 13 illustrates a block diagram of a system for continuing operation of the MUSIM UE in a specific mode, in accordance with embodiments of the present disclosure.

FIG. 13 illustrates a block diagram of a system 1300 for continuing operation of the MUSIM UE in the specific mode, in accordance with embodiments of the present disclosure. It should be noted that the system 1300 may be a part of the MUSIM UE. In embodiments, the system 1300 may be connected to the MUSIM UE. The system 1300 may include but is not limited to, a processor 1302, a memory 1304, a transceiver 1306, and/or a data unit 1308. The memory 1304 and the transceiver 1306 may be coupled to the processor 1302. The system 1300 may be configured to perform methods as discussed in reference to FIGS. 3-12. The processor 1302 may be configured to transmit the indication of the compatible band information and the one or more other stacks serving band information via the transceiver 1306. The processor 1302 may be configured to receive the RRC reconfiguration signalling message via the transceiver 1306. According to embodiments, operations described herein as being performed by SIM1 401 and/or SIM2 405 may be performed by the processor 1302. According to embodiments, operations described herein as being performed by the MUSIM UE may be performed by the processor 1302.

The system 1300 and/or the MUSIM UE may be fixed or mobile and may refer to any device that may communicate with a base station (e.g., the first network 403 and/or the second network 407) to transmit and receive data and/or control information. For example, the system 1300 and/or the MUSIM UE may refer to a terminal, a terminal equipment, a mobile station (MS), a mobile terminal (MT), a user terminal (UT), a subscriber station (SS), a wireless device, a handheld device, or the like.

The processor 1302 may be a single processing unit or several units, all of which could include multiple computing units. The processor 1302 may be implemented as one or more microprocessors, microcomputers, microcontrollers, digital signal processors, central processing units, state machines, logic circuitries, and/or any MUSIM UEs that manipulate signals based on operational instructions. Among other capabilities, the processor 1302 is configured to fetch and execute computer-readable instructions and data stored in the memory 1304, respectively.

The memory 1304 may include any non-transitory computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes.

The data unit 1308 serves, amongst other things, as a repository for storing data processed, received, and generated by the processor 1302.

Figure 14:
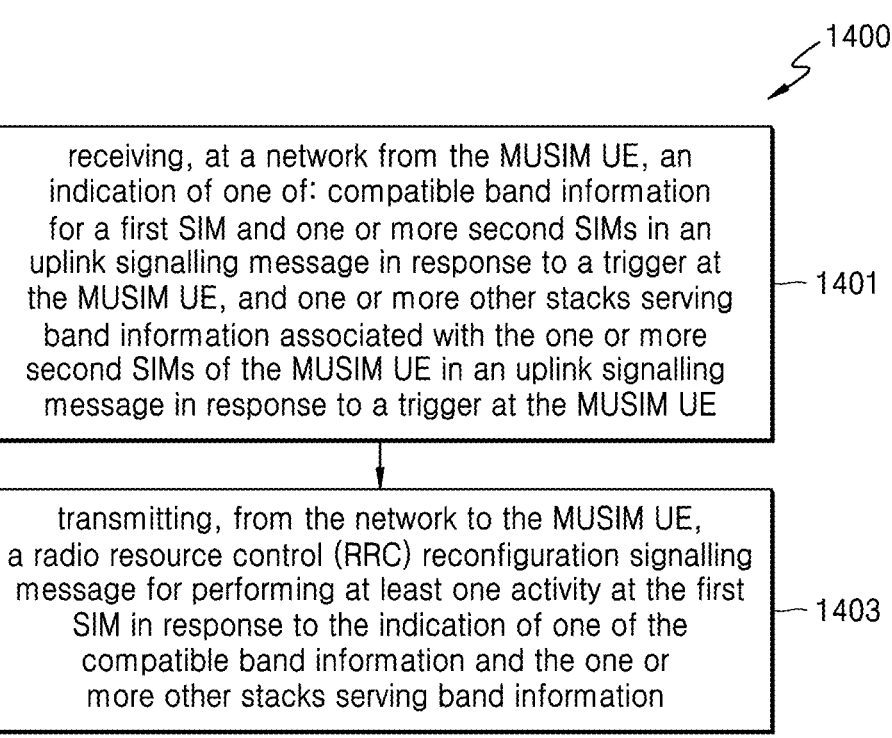
FIG. 14 illustrates a flow chart depicting a method for continuing operation of the MUSIM UE in the specific mode, in accordance with embodiments of the present disclosure.

FIG. 14 illustrates a flow chart depicting a method 1400 for continuing operation of the MUSIM UE in the specific mode, in accordance with embodiments of the present disclosure. It should be noted that the method as described in reference to FIG. 14 may be performed by a network associated with the MUSIM UE. In embodiments, the MUSIM UE may comprise two SIMS, e.g., a first SIM connected with a first network and a second SIM connected with a second network. If the MUSIM UE is currently communicating via the first SIM, then the method of FIG. 14 may be performed by the first network. Referring back to FIG. 14, as shown in FIG. 14, at operation 1401, the method 1400 may include receiving from the MUSIM UE, an indication of one of: compatible band information for a first SIM and one or more second SIMS in an uplink signalling message in response to a trigger at the MUSIM UE, and one or more other stacks serving band information associated with the one or more second SIMS of the MUSIM UE in an uplink signalling message in response to a trigger at the MUSIM UE. The compatible band information and the one or more other stacks band information facilitate in continuing operation of the MUSIM UE in the specific mode. In embodiments, the indication may be received analogues to the techniques as discussed in reference to operation 301. Further, the method 1400 includes determining a behaviour of network when the measurement report with priority information or band preferred information is shared. At operation 1403, the method 1400 may include transmitting to the MUSIM UE, the RRC reconfiguration signalling message for performing at least one activity at the first SIM in response to the indication of one of the compatible band information and the one or more other stacks serving band information. It should be noted that the RRC reconfiguration signalling message is already explained in reference to FIG. 3 and hence, the description of the same is omitted here for the sake of brevity of the description.

Figure 15:
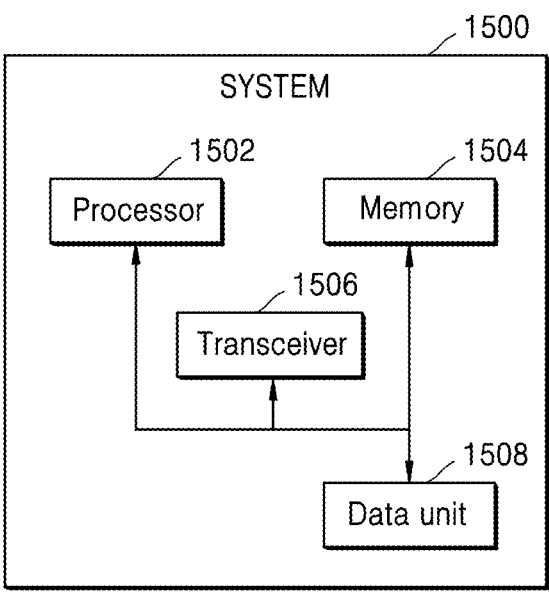
FIG. 15 illustrates a block diagram of a system for continuing operation of the MUSIM UE in a specific mode, in accordance with embodiments of the present disclosure.

FIG. 15 illustrates a block diagram of a system 1500 for continuing operation of the MUSIM UE in the specific mode, in accordance with embodiments of the present disclosure. It should be noted that the system 1500 may be a part of the network associated with the MUSIM UE. In embodiments, the system 1500 may be connected to the network. The system 1500 may include but is not limited to, a processor 1502, a memory 1504, a transceiver 1506, and/or a data unit 1508. The memory 1504 and the transceiver 1506 may be coupled to the processor 1502. The system 1500 may be configured to perform methods as discussed in reference to FIG. 14. The processor 1502 may be configured to receive the indication of the compatible band information and the one or more other stacks serving band information via the transceiver 1506. The processor 1502 may be configured to transmit the RRC reconfiguration signalling message via the transceiver 1506.

The system 1500, the first network 403 and/or the second network 407 may be implemented by a respective base station. Such a base station may generally refer to a fixed station that communicates with user equipment and/or other base stations, and may exchange data and control information by communicating with user equipment and/or other base stations. For example, the base station may refer to a Node B, an evolved-Node B (eNB), a next generation Node B (gNB), a sector, a site, a base transceiver system (BTS), an access point (AP), a relay node, a remote radio head (RRH), a radio unit (RU), a small cell, or the like. In the present specification, a base station or a cell may be interpreted in a comprehensive sense to indicate some area or function covered by a base station controller (BSC) in Code Division Multiple Access (CDMA), a Node-B in wideband CDMA (WCDMA), an eNB in long-term evolution (LTE), a gNB or sector (site) in 5G, and the like, and may cover all the various coverage areas such as megacell, macrocell, microcell, picocell, femtocell and relay node, RRH, RU, and small cell communication range.

A wireless communication network between the MUSIM UE (e.g., the system 1300) and the base station (e.g., the system 1500, the first network 403 and/or the second network 407) may support communication between multiple users by sharing available network resources. For example, in the wireless communication network, information may be transmitted in various multiple access schemes, such as CDMA, Frequency Division Multiple Access (FDMA), Time Division Multiple Access (TDMA), Orthogonal Frequency Division Multiple Access (OFDMA), Single Carrier Frequency Division Multiple Access (SC-FDMA), OFDM-FDMA, OFDM-TDMA, and OFDM-CDMA.

The processor 1502 may be a single processing unit or several units, all of which could include multiple computing units. The processor 1502 may be implemented as one or more microprocessors, microcomputers, microcontrollers, digital signal processors, central processing units, state machines, logic circuitries, and/or any MUSIM UEs that manipulate signals based on operational instructions. Among other capabilities, the processor 1502 is configured to fetch and execute computer-readable instructions and data stored in the memory 1504, respectively.

The memory 1504 may include any non-transitory computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes.

The data unit 1508 serves, amongst other things, as a repository for storing data processed, received, and generated by the processor 1502.

Accordingly, the present disclosure discloses the techniques which allow the MUSIM UE to remain in MTx/NRx mode of operation by making the network configure only compatible bands considering serving band information of all the SIMs associated with the MUSIM UE. This way the MUSIM UE may provide improved services to a user and the MUSIM UE without falling back to a 1Tx/1Rx mode of operation because the MUSIM UE may operate in the MTx/NRx mode of operation.

Conventional devices and methods for performing simultaneous or contemporaneous communication through a plurality of SIMs (also referred to herein as a first mode) fail to operate in the first mode with sufficient consistency. For example, the conventional devices and methods excessively connect one of the plurality of SIMS to a cell operating at a frequency that is incompatible with that of another of the plurality of SIMs, such that the conventional devices and methods are unable to communicate in the first mode. As a result of being unable to communicate in the first mode, the plurality of SIMs communicate alternatingly such that an overall bandwidth of the conventional devices and methods is reduced, and a communication delay of the conventional devices and methods is increased.

However, according to embodiments, improved devices and methods are provided for performing communication in the first mode. For example, the improved devices and methods may initiate connections between a first SIM among the plurality of SIMs with a cell based on whether an operating frequency of the cell is compatible with a frequency of one or more second SIMs among the plurality of SIMS. Accordingly, the improved devices and methods reduce a frequency of occurrence in which the first SIM connects to a cell operating at a frequency that is incompatible with that of the one or more second SIMs, thereby enabling the improved devices and methods to communicate in the first mode more consistently than is the case with the conventional devices and methods. Thus, the improved devices and methods overcome the deficiencies of the conventional devices and methods to at least increase bandwidth and decrease communication delay.

According to embodiments, operations described herein as being performed by the SIM 1 101, the first network 103, the SIM 2 105, the second network 107, the SIM 1 201, the first network 203, the SIM 2 205, the second network 207, the SIM1 401, the first network 403, the SIM2 405, the second network 407, the system 1300, the processor 1302, the transceiver 1306, the system 1500, the processor 1502, and/or the transceiver 1506 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium (e.g., the memory 1304, the data unit 1308, the memory 1504 and/or the data unit 1508). A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail herein. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, contemporaneously, or in some cases be performed in reverse order.

Unless otherwise defined, all technical and scientific terms used herein have the same meaning as, or a similar meaning to, that commonly understood by one of ordinary skilled in the art to which the inventive concepts belong. The system, methods, and examples provided herein are illustrative only and not intended to be limiting.

Benefits, other advantages, and solutions to challenges have been described above with regard to specific examples. However, the benefits, advantages, solutions to challenges, and any component(s) that may cause any benefit, advantage, or solution to occur or become more pronounced are not to be construed as a critical, required, or essential feature or component of any or all the claims.

While specific language has been used to describe the present subject matter, any limitations arising on account thereto, are not intended. As would be apparent to a person in the art, various working modifications may be made to the method in order to implement the inventive concepts as taught herein. The drawings and the foregoing description give examples of embodiments. Those skilled in the art will appreciate that one or more of the described elements may well be combined into a single functional element. Alternatively, certain elements may be split into multiple functional elements. Elements from one example may be added to another example.

We claim:

1. A method performed by a multi-subscriber identity module (MUSIM) user equipment (UE) for continuing operation of the MUSIM UE in a first mode, the MUSIM UE including a first SIM and one or more second SIMs, and the method comprising:

transmitting, by the MUSIM UE, an uplink signalling message in response to determining a trigger condition has been satisfied, the uplink signalling message including one of, compatible band information for the first SIM and the one or more second SIMs, or one or more other stacks serving band information associated with the one or more second SIMs;

receiving, by the MUSIM UE from a network, a radio resource control (RRC) reconfiguration signalling message for performing at least one activity at the first SIM in response to the transmitting the uplink signalling message, the at least one activity including connecting with or measuring a first cell based on a first determination that a first frequency band of the first cell is compatible with serving bands of the first SIM and the one or more second SIMs, the first determination being based on the uplink signalling message; and performing, by the MUSIM UE, the at least one activity based on the RRC reconfiguration signalling message.

2. The method as claimed in claim 1, wherein the first SIM is communicating via a first protocol stack when the determining the trigger condition has been satisfied is performed; and the one or more second SIMs is communicating via a one or more second protocol stacks when the determining the trigger condition has been satisfied is performed.

3. The method as claimed in claim 1, wherein the performing the at least one activity comprises one of:

configuring the first SIM to connect with the first cell, the first cell being a first primary cell compatible with serving bands of the first SIM and the one or more second SIMs, and the compatibility of the first primary cell being determined based on the compatible band information or the one or more other stacks serving band information;

configuring the first SIM to connect with one or more first secondary cells compatible with the serving bands of the first SIM and the one or more second SIMs, the first cell being among the one or more first secondary cells, and the compatibility of the one or more first secondary cells being determined based on the compatible band information or the one or more other stacks serving band information;

configuring the first SIM to connect with the first cell, the first cell being a second primary cell on a secondary cell group (SCG) compatible with the serving bands of the first SIM and the one or more second SIMs, and the compatibility of the second primary cell being determined based on the compatible band information or the one or more other stacks serving band information;

configuring the first SIM to connect with one or more second secondary cells on an SCG compatible with the serving bands of the first SIM and the one or more second SIMs, the first cell being among the one or more second secondary cells, and the compatibility of the one or more second secondary cells being determined based on the compatible band information and the one or more other stacks serving band information;

configuring the first SIM to measure one or more first measurement objects compatible with the serving bands of the first SIM and the one or more second SIMs, the first cell being among the one or more first measurement objects; or configuring the first SIM to measure one or more second measurement objects with an associated priority, the one or more second measurement objects including a first measurement object and a second measurement object, the first cell being the first measurement object, the MUSIM UE being configured to prioritize measurement on the first measurement object having a higher priority over measurement on the second measurement object having a lower priority, the first measurement object being configured with a band compatible with the first SIM and the one or more second SIMs, and the second measurement object being configured with a band not compatible with the first SIM or the one or more second SIMs.

4. The method as claimed in claim 1, wherein the trigger condition comprises:
  a switch by one of the first SIM or the one or more second SIMs to a connected mode; or
  detection of a change in serving band information of the first SIM or any of the one or more second SIMs.

5. The method as claimed in claim 1, wherein the trigger condition comprises a request received from the network to obtain, from the MUSIM UE, one or more bands compatible with at least one of a carrier aggregation (CA) or a dual connectivity (DC).

6. The method as claimed in claim 1, comprising:
  triggering, by the MUSIM UE, a measurement report associated with the RRC reconfiguration signalling message, the measurement report including an optional information element (IE) corresponding to the first mode.

7. The method as claimed in claim 1, wherein
the performing the at least one activity comprises configuring the first SIM to measure one of a higher-priority measurement object or a lower-priority measurement object, the first cell being the higher-priority measurement object; and
the method further comprises,
  determining, by the MUSIM UE, whether a cell associated with the higher-priority measurement object is available and satisfies a measurement threshold, and
  triggering, by the MUSIM UE,
    a first measurement report associated with the higher-priority measurement object in response to determining the cell associated with the higher-priority measurement object is available and satisfies the measurement threshold, or
    a second measurement report associated with the lower-priority measurement object in response to determining the cell associated with the higher-priority measurement object is not available or does not satisfy the measurement threshold.

8. The method as claimed in claim 1, wherein
the RRC reconfiguration signalling message includes a plurality of measurement objects with no associated indication of priority; and
the method further comprises:
  prioritizing measurement associated with one or more compatible measurement objects among the plurality of measurement objects that are compatible with serving bands of the first SIM and the one or more second SIMs, the compatibility of the one or more compatible measurement objects being determined based on the compatible band information or the one or more other stacks serving band information,
  determining whether one or more cells associated with the one or more compatible measurement objects are available and whether one or more respective signal strengths corresponding to the one or more cells satisfy a measurement threshold, and
  performing measurement for,
    the one or more compatible measurement objects in response to determining that the one or more cells are available and the one or more respective signal strengths are above the measurement threshold, or
    one or more non-compatible measurements objects among the plurality of measurement objects in response to determining that the one or more cells are not available, the one or more respective signal strengths are not above the measurement threshold, or that no band corresponding to the plurality of measurement objects is compatible with the serving bands of the first SIM or the one or more second SIMs.

9. The method as claimed in claim 1, wherein
the RRC reconfiguration signalling message includes a conditional handover (CHO) configuration; and
the method further comprises:
  prioritizing to connect to a target primary cell with a band compatible with the first SIM and the one or more second SIMs, the target primary cell being included in a list of target cells received from the network, and the compatibility of the target primary cell being determined based on the compatible band information or the one or more other stacks serving band information,
  determining whether a signal strength of the target primary cell is above a measurement threshold, and
  triggering a RRC reconfiguration complete signalling message to,
    the target primary cell on the band compatible with the first SIM and the one or more second SIMs in response to determining the signal strength is above the measurement threshold, or
    a target cell among the list of target cells other than the target primary cell in response to determining the signal strength of the target primary cell is not above the measurement threshold.

10. The method as claimed in claim 1, wherein the first mode comprises a multi-transmission multi-reception mode of operation of the MUSIM UE.

11. The method as claimed in claim 1, further comprising:
generating a communication signal; and
transmitting the communication signal to the first cell via the first SIM.

12. The method as claimed in claim 11, wherein the performing the at least one activity includes connecting the first SIM to the first cell based on the first determination.

13. The method as claimed in claim 11, wherein
the performing the at least one activity includes measuring a signal strength of the first cell via the first SIM based on the first determination; and
the method further comprises connecting the first SIM to the first cell after the measuring the signal strength.

14. A method for continuing operation of a multi-subscriber identity module (MUSIM) user equipment (MUSIM UE) in a first mode, the MUSIM UE including a first SIM and one or more second SIMs, and the method comprising:
  receiving, at a network from the MUSIM UE, an uplink signalling message in response to satisfaction of a trigger condition at the MUSIM UE, the uplink signalling message including one of,
    compatible band information for the first SIM and the one or more second SIMs, or
    one or more other stacks serving band information associated with the one or more second SIMs; and
  transmitting, from the network to the MUSIM UE, a radio resource control (RRC) reconfiguration signalling message for performing at least one activity at the first SIM in response to the uplink signalling message, the at least one activity including connecting with or measuring a first cell based on a first determination that a first frequency band of the first cell is compatible with serving bands of the first SIM and the one or more second SIMs, the first determination being based on the uplink signalling message.

15. The method as claimed in claim 14, wherein the first SIM is communicating via a first protocol stack when the receiving the uplink signalling message is performed; and the one or more second SIMs is communicating via a one or more second protocol stack when the receiving the uplink signalling message is performed.

16. The method as claimed in claim 14, wherein the RRC reconfiguration signalling message comprises one of:

a configuration for configuring the first SIM to connect with the first cell, the first cell being a first primary cell compatible with serving bands of the first SIM and the one or more second SIMs;

a configuration for configuring the first SIM to connect with one or more first secondary cells compatible with the serving bands of the first SIM and the one or more second SIMs, the first cell being among the one or more first secondary cells;

a configuration for configuring the first SIM to connect with the first cell, the first cell being a second primary cell on a secondary cell group (SCG) compatible with the serving bands of the first SIM and the one or more second SIMs;

a configuration for configuring the first SIM to connect with one or more second secondary cells on a SCG compatible with the serving bands of the first SIM and the one or more second SIMs, the first cell being among the one or more second secondary cells;

a configuration for configuring the first SIM to measure one or more first measurement objects compatible with the serving bands of the first SIM and the one or more second SIMs, the first cell being among the one or more first measurement objects;

a configuration for configuring the first SIM to measure one or more second measurement objects with an associated priority;

a configuration for configuring the first SIM with one of a higher-priority measurement object or a lower-priority measurement object, the first cell being the higher-priority measurement object;

a configuration for configuring the first SIM with one or more third measurement objects with no associated priority; or a configuration for configuring the first SIM with a conditional handover (CHO).

17. The method as claimed in claim 14, wherein the receiving the uplink signalling message comprises:

receiving the uplink signalling message in response to a request transmitted to the MUSIM UE to obtain one or more bands compatible with at least one of a carrier aggregation (CA) or a dual connectivity (DC).

18. The method as claimed in claim 14, wherein the first mode comprises a multi-transmission multi-reception mode of operation of the MUSIM UE.

19. A system for continuing operation of a multi-subscriber identity module (MUSIM) user equipment (UE) in a first mode, the MUSIM UE including a first SIM and one or more second SIMs, and the system comprising:

processing circuitry configured to, transmit an uplink signalling message in response to determining a trigger condition has been satisfied, the uplink signalling message including one of, compatible band information for the first SIM and the one or more second SIMs, or one or more other stacks serving band information associated with the one or more second SIMs, receive, from a network, a radio resource control (RRC) reconfiguration signalling message for performing at least one activity at the first SIM in response to the transmission of the uplink signalling message, and perform the at least one activity based on the RRC reconfiguration signalling message, the at least one activity including connecting with or measuring a first cell based on a first determination that a first frequency band of the first cell is compatible with serving bands of the first SIM and the one or more second SIMs, the first determination being based on the uplink signalling message.

20. The system as claimed in claim 19, wherein the first SIM is communicating via a first protocol stack when the determining the trigger condition has been satisfied is performed; and the one or more second SIMs is communicating via a one or more second protocol stacks when the determining the trigger condition has been satisfied is performed.

* * * * *